United States Patent
Takahashi et al.

(10) Patent No.: US 12,289,069 B2
(45) Date of Patent: Apr. 29, 2025

(54) OUTPUT VARIABLE TYPE ELECTRIC GENERATOR

(71) Applicant: HOKUETSU INDUSTRIES CO., LTD., Niigata (JP)

(72) Inventors: Shinichiro Takahashi, Niigata (JP); Yuichi Kaneko, Niigata (JP)

(73) Assignee: HOKUETSU INDUSTRIES CO., LTD., Niigata (JP)

( * ) Notice: Subject to any disclaimer, the term of this patent is extended or adjusted under 35 U.S.C. 154(b) by 247 days.

(21) Appl. No.: 18/178,835

(22) Filed: Mar. 6, 2023

(65) Prior Publication Data

US 2024/0106366 A1 Mar. 28, 2024

(30) Foreign Application Priority Data

Sep. 16, 2022 (JP) .................. 2022-148629

(51) Int. Cl.
*H02P 27/06* (2006.01)
*H02P 9/02* (2006.01)

(52) U.S. Cl.
CPC ............... *H02P 27/06* (2013.01); *H02P 9/02* (2013.01)

(58) Field of Classification Search
CPC .... H02P 27/06; H02P 9/02; H02P 9/00; H02P 25/188
USPC ................................. 290/7; 322/44
See application file for complete search history.

(56) References Cited

U.S. PATENT DOCUMENTS

| | | | | |
|---|---|---|---|---|
| 6,377,478 B1* | 4/2002 | Morishita | ............... | H02P 23/06 363/71 |
| 2012/0294050 A1* | 11/2012 | Hashimoto | ............. | F02D 29/06 363/37 |

FOREIGN PATENT DOCUMENTS

| | | |
|---|---|---|
| JP | 2006-087268 A | 3/2006 |
| JP | 2022-075214 A | 5/2022 |

* cited by examiner

*Primary Examiner* — Charles Reid, Jr.
(74) *Attorney, Agent, or Firm* — Rankin, Hill & Clark LLP

(57) ABSTRACT

An output variable type electric generator includes an inverter output circuit having an inverter and a standard output circuit between an electric generator main body outputting a three-phase alternating current of low voltage and high voltage by switching a wire connection pattern of armature coils and a three-phase output terminal block. The generator further includes an output format selector switch. The switch includes a wire connection switching section to switch a wire connection pattern; a connection switching section to switch between the inverter output circuit and the standard connection circuit; and an interlocking mechanism to cause the wire connection switching section and the connection switching section to interlock with each other, and the interlocking mechanism causes the wire connection switching section to switch to a wire connection pattern for generating a voltage corresponding to a specification voltage of the inverter when the connection switching section select the inverter output circuit.

10 Claims, 27 Drawing Sheets

[Example 1]

Inverter output of three phase AC 200V

[Example 1]

Standard output of three phase AC 400V

[Example 1]
Standard output of single phase AC 200V/100V

[Example 2]

Inverter output of three phase AC 400V

[Example 2]

Standard output of three phase AC 200V (Example 2)

Standard output of single phase AC 200V/100V

[Example 3]
Inverter output of three phase AC 200V

[Example 3]
Standard output of three phase AC 200V (Example 3)
Standard output of three phase AC 400V (Example 4)
Inverter output of three phase AC 400V (Example 4)
Standard output of three phase AC 400V (Example 4)
Standard output of three phase AC 200V (Example 5)
Inverter output of three phase AC 200V (Example 5)
Standard output of three phase AC 400V

[Example 6]
Inverter output of three phase AC 400V

[Example 6]
Standard output of three phase AC 200V (Example 7)
Standard output of three phase AC 200V Standard output of three phase AC 400V

[Example 8]

Standard output of single phase AC 200V/100V

OUTPUT VARIABLE TYPE ELECTRIC GENERATOR

BACKGROUND OF THE INVENTION

1. Field of the Invention

The present invention relates to an output variable type electric generator which enables an output to be varied by switching a wire connection pattern of armature coils of an electric generator main body.

2. Description of the Related Art

When various working machines, lighting apparatus, video and audio equipment, and other equipment (simply referred to as "load" in the specification) operated by electric power are used at construction sites, various event sites, etc., especially outdoors, electric generators with a driving source such as an engine are used as a supply source of electric power for such loads.

In such electric generators, a U-phase armature of an electric generator main body consists of a pair of armature coils Ua and Ub, a V-phase armature of the electric generator main body consists of a pair of armature coils Va and Vb, and a W-phase armature of the electric generator main body consists of a pair of armature coils Wa and Wb, in order to support different input voltages requested by a load side. In addition, the electric generators are configured to switch a wire connection pattern between a low voltage wire connection in which the armature coils (Ua and Ub, Va and Vb, Wa and Wb) in each phase (U phase, V phase, W phase) are connected in parallel as illustrated in FIG. 16A, and a high voltage wire connection in which the armature coils in each phase are connected in series as illustrated in FIG. 16B. In addition, for example, the low voltage wire connection illustrated in FIG. 16A can output a three-phase alternating current of 200 V, and the high voltage wire connection illustrated in FIG. 16B can output a three-phase alternating current of 400 V.

In addition to the above-described three-phase alternating current outputs, it is also possible to output a single-phase alternating current of a predetermined voltage (for example, single-phase 100 V between N and U and single-phase 200 V between U and W) by changing the wire connection pattern of the armature coils to a state illustrated in FIG. 16C.

Conventionally, the wire connection pattern of the armature coils Ua and Ub, Va and Vb, and Wa and Wb is switched by using a terminal strip 140 as illustrated in FIG. 17, for example. That is, the wire connection pattern of the armature coils connected to terminals 141 of the terminal strip 140 is switched between the low voltage wire connection (FIG. 16A) and the high voltage wire connection (FIG. 16B) by changing an attachment position of a short circuit plate 142 causing a short circuit between the terminals 141 of the terminal strip 140 from a position illustrated in FIG. 17A to a position illustrated in FIG. 17B, for example.

However, to switch an output of the electric generator through the above-described way, it is necessary to temporarily remove the short circuit plate 142 from the terminal strip 140 by, for example, loosing a screw with which the short circuit plate 142 is fixed to the terminal strip 140, and then attach the short circuit plate 142 at an exact position on the terminal strip 140 by, for example, tightening the screw so as to obtain a desired wire connection pattern. As described above, the work involved in switching the wire connection pattern is complicated, and there is a possibility that attachment of the short circuit plate 142 at a wrong position may cause damage to the electric generator main body or the load.

Therefore, to easily switch the wire connection pattern and prevent the damage and the like to the electric generator main body or the load due to an improper connection, an electric generator disclosed in Japanese Patent Application Laid-open No. 2006-087268 referred below is configured to easily switch between the low voltage wire connection illustrated in FIG. 16A and the high voltage wire connection illustrated in FIG. 16B by using a single switch such as a cam switch, and include a confirmation switch having switching positions which are allocated to selectable output formats respectively.

In addition, the electric generator disclosed in Japanese Patent Application Laid-open No. 2006-087268 prevents the damage and the like to the electric generator main body or the load due to an improper connection by being equipped with a safety device that allows an output from the electric generator only when a switching position of the confirmation switch matches a switching position of a switch for switching a wire connection.

Note that some electric generators may be equipped with an inverter to enable an output frequency to be varied, temporarily converts a three-phase alternating current output from an electric generator main body into a direct current, and then converts the direct current into a three-phase alternating current of a predetermined frequency to output the current.

In addition, Japanese Patent Application Laid-open No. 2022-075214 referred below discloses an electric generator including such an inverter. The electric generator alternatively selects an inverter output circuit including the inverter or a standard output circuit including no inverter to make a connection between the electric generator main body and a three-phase output terminal block. This makes it possible to switch an output to a load connected to the three-phase output terminal block between an inverter output for which a three-phase alternating current generated by the electric generator main body is subjected to a frequency conversion through the inverter and then output, and a standard output for which a three-phase alternating current generated by the electric generator main body is output directly.

The following four three-phase alternating current output patterns are considered when the electric generator disclosed in Japanese Patent Application Laid-open No. 2006-087268 described above in which a three-phase alternating current to be output is changeable between a low voltage (for example, three-phase 200 V) and a high voltage (for example, three-phase 400 V) by changing the wire connection pattern of the armature coils of the electric generator main body is further equipped with an inverter following the electric generator disclosed in Japanese Patent Application Laid-open No. 2022-075214, and it is possible to alternatively switch between the inverter output for which a three-phase alternating current generated by the electric generator main body is subjected to a frequency conversion through the inverter and then output, and the standard output for which a three-phase alternating current generated by the electric generator main body is output directly without the inverter.

Inverter output of a high voltage (for example, 400 V)
Standard output of a high voltage (for example, 400 V)
Inverter output of a low voltage (for example, 200 V)
Standard output of a low voltage (for example, 200 V)

However, a voltage value that can be input to the inverter is determined according to its specifications, and the inverter may not operate properly or may be damaged when a three-phase alternating current of a low voltage (for example, 200 V) is input from the electric generator to an inverter compliant with high voltage specifications (for example, 400 V specifications), or a three-phase alternating current of a high voltage (for example, 400 V) is input from the electric generator main body to an inverter compliant with low voltage specifications (for example, 200 V specifications).

Therefore, it is necessary to be able to input a three-phase alternating current generated by the electric generator main body to the inverter only when an output voltage of the electric generator main body, that is, a wire connection pattern of the armature coils of the electric generator main body corresponds with a specification voltage of the inverter.

As such a method, it is also considered that the electric generator is equipped with a confirmation switch having switching positions which are allocated to selectable output formats respectively, for example, following the configuration of Japanese Patent Application Laid-open No. 2006-087268, and is equipped with a safety device that allows an output from the electric generator only when achieving a correct combination of switching positions of three switches including a switch for switching a wire connection pattern of the armature coils of the electric generator main body, a switch for switching between an output from the inverter output circuit and an output from the standard output circuit, and the confirmation switch.

However, such a configuration requires a proper operation so as to achieve a predefined combination of the three switches to allow the output from the electric generator, and causes a complicated operation to change the output from the electric generator.

Moreover, when the wire connection of the armature coils of the electric generator main body can be further switched to a single-phase alternating current wire connection illustrated in FIG. 16C in addition to the above-described switching of the three-phase alternating current output, the operation to change the output format is made more complicated.

Therefore, according to the present invention, it is possible to switch an output from an electric generator main body between three-phase alternating current outputs of a low voltage and a high voltage, or, in addition to these, a single-phase alternating current output by a very simple operation, and switch between a three-phase alternating current output through an inverter (inverter output) and a direct three-phase output from the electric generator main body (standard output), or, in addition to these, and a single-phase alternating current direct output. At the same time, an object of the present invention is to provide an output variable type electric generator capable of certainly preventing a malfunction of or damage to an inverter due to an improper connection by connecting an inverter output circuit to the electric generator main body only when a wire connection pattern of armature coils of the electric generator main body, in other words, a voltage of a three-phase alternating current output from the electric generator main body corresponds to a specification voltage of the inverter.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above object, an output variable type electric generator 1 according to the present invention comprises:

an electric generator main body 10 capable of switching a three-phase alternating current to be output between a low voltage (for example, 200 V) and a high voltage (for example, 400 V) by switching a wire connection pattern of armature coils Ua, Ub; Va, Vb; Wa, Wb, the output variable type electric generator 1 including an inverter output circuit 34 and a standard output circuit 36 between the electric generator main body 10 and a three-phase output terminal block 20, the inverter output circuit 34 connecting the electric generator main body 10 to the three-phase output terminal block 20 through an inverter 32 having a specification voltage corresponding to the low voltage or the high voltage, the standard output circuit 36 connecting the electric generator main body 10 to the three-phase output terminal block 20 without the inverter 32, the output variable type electric generator 1 further including an output format selector switch 40 (for example, a cam switch) having at least two switching positions including an inverter output position for selecting an output through the inverter output circuit 34 and a standard output position for selecting an output through the standard output circuit 36, the output format selector switch 40 including:
　a wire connection switching section 41 to switch a wire connection of the armature coils Ua, Ub; Va, Vb; Wa, Wb of the electric generator main body 10 between a low voltage wire connection pattern and a high voltage wire connection pattern;
　a connection switching section 42 to switch a connection of the electric generator main body 10 and the three-phase output terminal block 20 between an inverter connection performed through the inverter output circuit 34 or a standard connection performed through the standard output circuit 36; and
　an interlocking mechanism 43 to cause the wire connection switching section 41 and the connection switching section 42 to interlock with each other, and the interlocking mechanism 43 causing the connection switching section 42 to perform the inverter connection and causing the wire connection switching section 41 to switch to a wire connection pattern for generating a voltage corresponding to the specification voltage of the inverter 32 when the switching position of the output format selector switch 40 is in the inverter output position (Examples 1 to 6; see FIGS. 5 to 10).

When the switching position of the output format selector switch 40 is in the standard output position, the interlocking mechanism 43 may be further configured to causes the connection switching section 42 to perform the standard connection and causes the wire connection switching section 41 to perform switching to a wire connection pattern for generating a voltage that is different from the specification voltage of the inverter 32 (Examples 1 to 6; see FIGS. 5 to 10).

In the output variable type electric generator 1 configured as described above, it may be configured that the output format selector switch 40 further has a second standard output position as the switching position, and when the switching position of the output format selector switch 40 is in the second standard output position, the interlocking mechanism 43 causes the connection switching section 42 to perform the standard connection and causes the wire connection switching section 41 to perform switching to the wire connection pattern for generating the voltage corresponding to the specification voltage of the inverter 32 (Examples 3, 4; see FIGS. 7, 8).

Another output variable type electric generator 1 according to the present invention comprises:

an electric generator main body 10 capable of switching a three-phase alternating current to be output between a low voltage (for example, 200 V) and a high voltage (for example, 400 V) by switching a wire connection pattern of armature coils (Ua, Ub; Va, Vb; Wa, Wb), the output variable type electric generator 1 including a low voltage inverter output circuit 34a and a high voltage inverter output circuit 34b between the electric generator main body 10 and a three-phase output terminal block 20, the low voltage inverter output circuit 34a connecting the electric generator main body 10 to the three-phase output terminal block 20 through a low voltage inverter 32a having a specification voltage corresponding to the low voltage (for example, 200 V), the high voltage inverter output circuit 34b connecting the electric generator main body 10 to the three-phase output terminal block 20 through a high voltage inverter 32b having a specification voltage corresponding to the high voltage (for example, 400 V), the output variable type electric generator 1 further including an output format selector switch 40 (a cam switch) having at least two switching positions including a low voltage inverter output position for selecting an output through the low voltage inverter output circuit 34a and a high voltage inverter output position for selecting an output through the high voltage inverter output circuit 34b, the output format selector switch 40 including:

a wire connection switching section 41 to switch a wire connection of the armature coils Ua, Ub; Va, Vb; Wa, Wb of the electric generator main body 10 between a low voltage wire connection pattern and a high voltage wire connection pattern;

a connection switching section 42 to switch a connection of the electric generator main body 10 and the three-phase output terminal block 20 between a low voltage inverter connection performing through the low voltage inverter output circuit 34a or a high voltage inverter connection performing through the high voltage inverter output circuit 34b; and an interlocking mechanism 43 to cause the wire connection switching section 41 and the connection switching section 42 to interlock with each other, when the switching position of the output format selector switch 40 being in the low voltage inverter output position, the interlocking mechanism 43 causing the connection switching section 42 to perform the low voltage inverter connection and causing the wire connection switching section 41 to switch to a wire connection pattern for generating a voltage corresponding to the specification voltage of the low voltage inverter 32a, and when the switching position of the output format selector switch 40 being in the high voltage inverter output position, the interlocking mechanism 43 causing the connection switching section 42 to perform the high voltage inverter connection and causing the wire connection switching section 41 to perform switching to a wire connection pattern for generating a voltage corresponding to the specification voltage of the high voltage inverter 32b (Example 7; see FIG. 11).

In the configuration of which the low voltage inverter 32a and the high voltage inverter 32b as described above, it may be configured that the output variable type electric generator 1 further includes a standard output circuit 36 between the electric generator main body 10 and the three-phase output terminal block 20, the standard output circuit 36 connects the electric generator main body 10 to the three-phase output terminal block 20 without the low voltage inverter 32a and the high voltage inverter 32b, the output format selector switch 40 further has a low voltage standard output position and a high voltage standard output position as the switching positions, the connection switching section 42 is capable of switching a connection of the electric generator main body 10 and the three-phase output terminal block 20 to a standard connection performing through the standard output circuit 36, when the switching position of the output format selector switch 40 is in the low voltage standard output position, the interlocking mechanism 43 causes the connection switching section 42 to perform the standard connection and causes the wire connection switching section 41 to perform switching to a wire connection pattern for generating a voltage corresponding to the low voltage, and when the switching position of the output format selector switch 40 is in the high voltage standard output position, the interlocking mechanism 43 causes the connection switching section 42 to perform the standard connection and causes the wire connection switching section 41 to perform switching to a wire connection pattern for generating a voltage corresponding to the high voltage (Example 7; see FIG. 11).

Either of the output variable type electric generator 1 may be configured that the wire connection switching section 41 of the output format selector switch 40 is further capable of switching to a wire connection pattern of the armature coils for allowing the electric generator main body 10 to output a single-phase alternating current in addition to switching between the low voltage and the high voltage of the three-phase alternating current output, the output format selector switch 40 further has a single-phase output position as the switching position, and when the switching position of the output format selector switch 40 is in the single-phase output position, the interlocking mechanism 43 causes the connection switching section 42 to perform the standard connection and causes the wire connection switching section 41 to perform switching to a wire connection pattern for outputting the single-phase alternating current (Examples 1, 2, and 8; see FIGS. 5, 6, and 11).

The above-described output variable type electric generator 1 according to the present invention can switch the wire connection pattern of the armature coils Ua and Ub, Va and Vb, and Wa and Wb of the electric generator main body 10 and an output format of an inverter output/standard output at the same time so as to achieve a correct combination simply by switching the output format selector switch 40 including a cam switch and the like to a desired switching position.

As a result, it is possible to switch the output format very easily. In addition, it is possible to prevent the inverter 32 from receiving a voltage that is different from the specification voltage of the inverter 32, and it is possible to certainly prevent a malfunction of or damage to the inverter 32 caused when a voltage that is different from its specification voltage is input to the inverter 32.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Figure 1A:
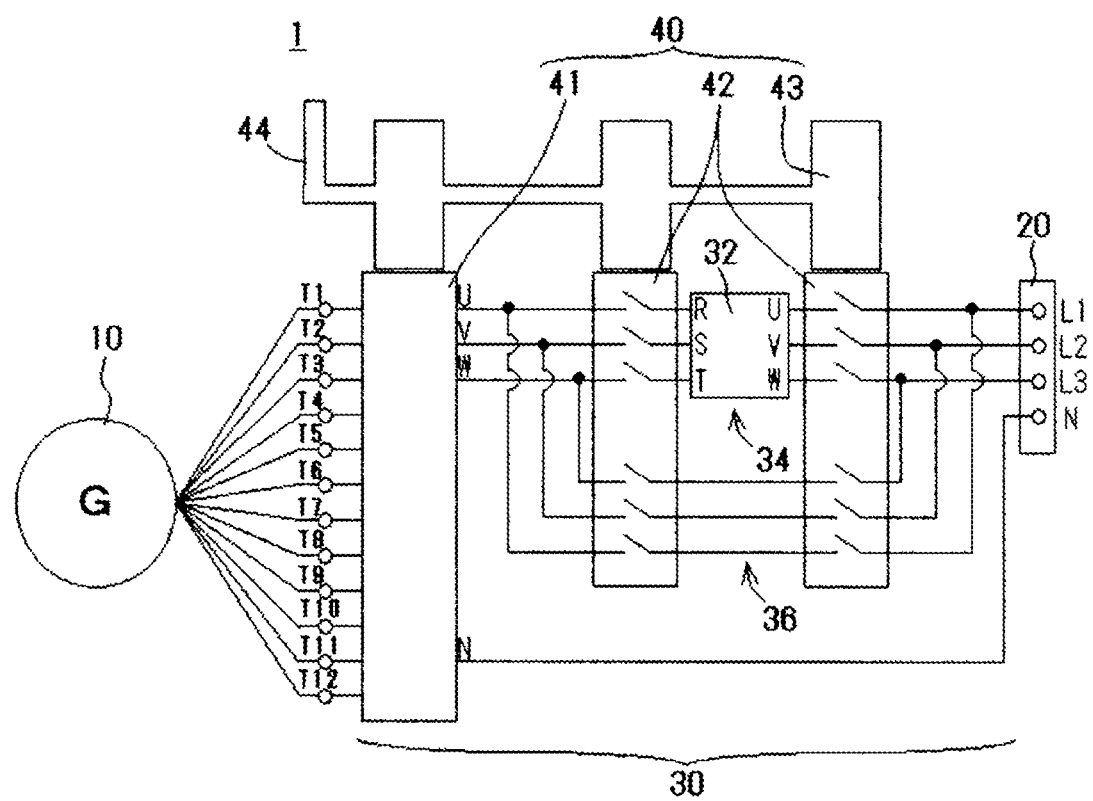
FIG. 1A is an explanatory diagram illustrating an embodiment of an output variable type electric generator including an inverter compliant with low voltage specifications or an inverter compliant with high voltage specifications according to the present invention.

Hereinafter, the output variable type electric generator 1 according to the present invention will be described with reference to the appended drawings.

Note that the following embodiment will be described on the assumption that the electric generator main body 10 outputs 200 V as a low voltage three-phase alternating current and 400 V as a high voltage three-phase alternating current, and outputs 200 V and 100 V as single-phase alternating currents. However, voltages of the three-phase alternating current and the single-phase alternating current output from the electric generator main body 10 are not limited thereto.

[Overall Configuration of Output Variable Type Electric Generator]

The reference numeral 1 in FIG. 1 denotes an output variable type electric generator according to the present invention. The output variable type electric generator 1 includes an electric generator main body 10, a three-phase output terminal block 20 to which a load (not illustrated) receiving supply of electric power generated in the electric generator main body 10 is connected, and an output circuit 30 that connects the electric generator main body 10 to the three-phase output terminal block 20.

The output circuit 30 is equipped with an output format selector switch 40 including a mechanical switch such as a cam switch. By operating the output format selector switch 40, it is possible to switch an output format of electric power to be output to the load through the three-phase output terminal block 20.

[Electric Generator Main Body]

The electric generator main body 10 of the output variable type electric generator 1 according to the present invention includes armatures of a U phase, a V phase, and a W phase. The armatures of each phase consists of a pair of armature coils (Ua and Ub, Va and Vb, Wa and Wb). The electric generator main body 10 is configured to switch a wire connection pattern of the armature coils Ua and Ub, Va and Vb, and Wa and Wb among a wire connection pattern for outputting a three-phase alternating current of 200 V (see FIG. 2), a wire connection pattern for outputting a three-phase alternating current of 400 V (see FIG. 3), and a wire connection pattern for outputting a single-phase alternating current of 200 V/100 V (see FIG. 4) if necessary, by a wire connection switching section 41 of the output format selector switch 40 described later.

Figure 2:
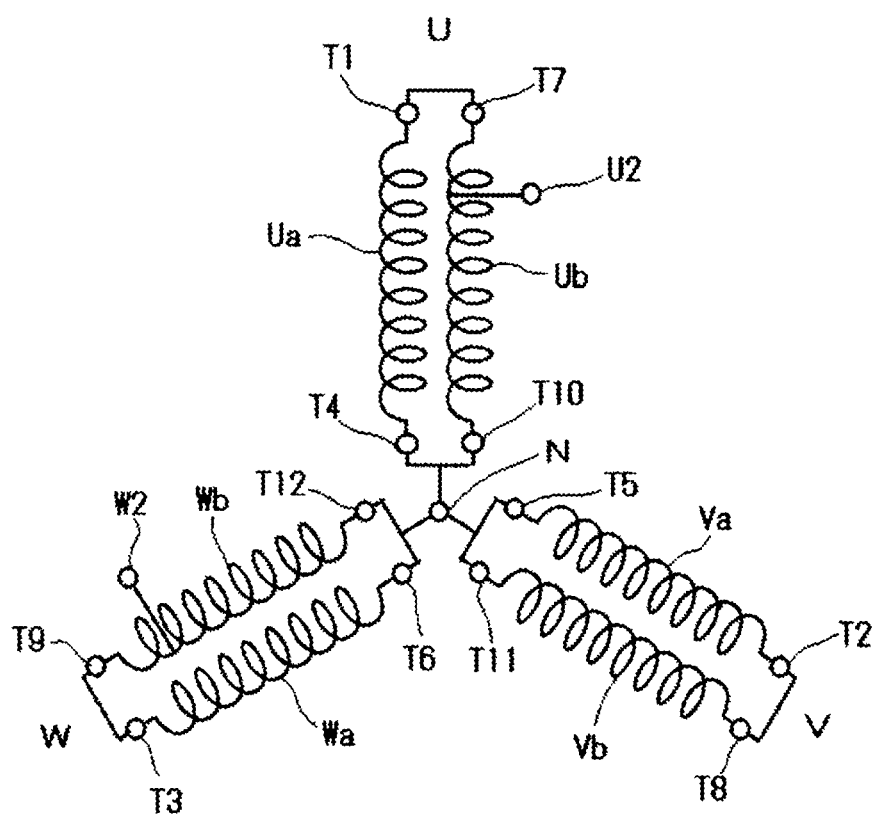
FIG. 2 is an explanatory diagram illustrating a wire connection pattern (low voltage three-phase alternating current) of armature coils.
Figure 3:
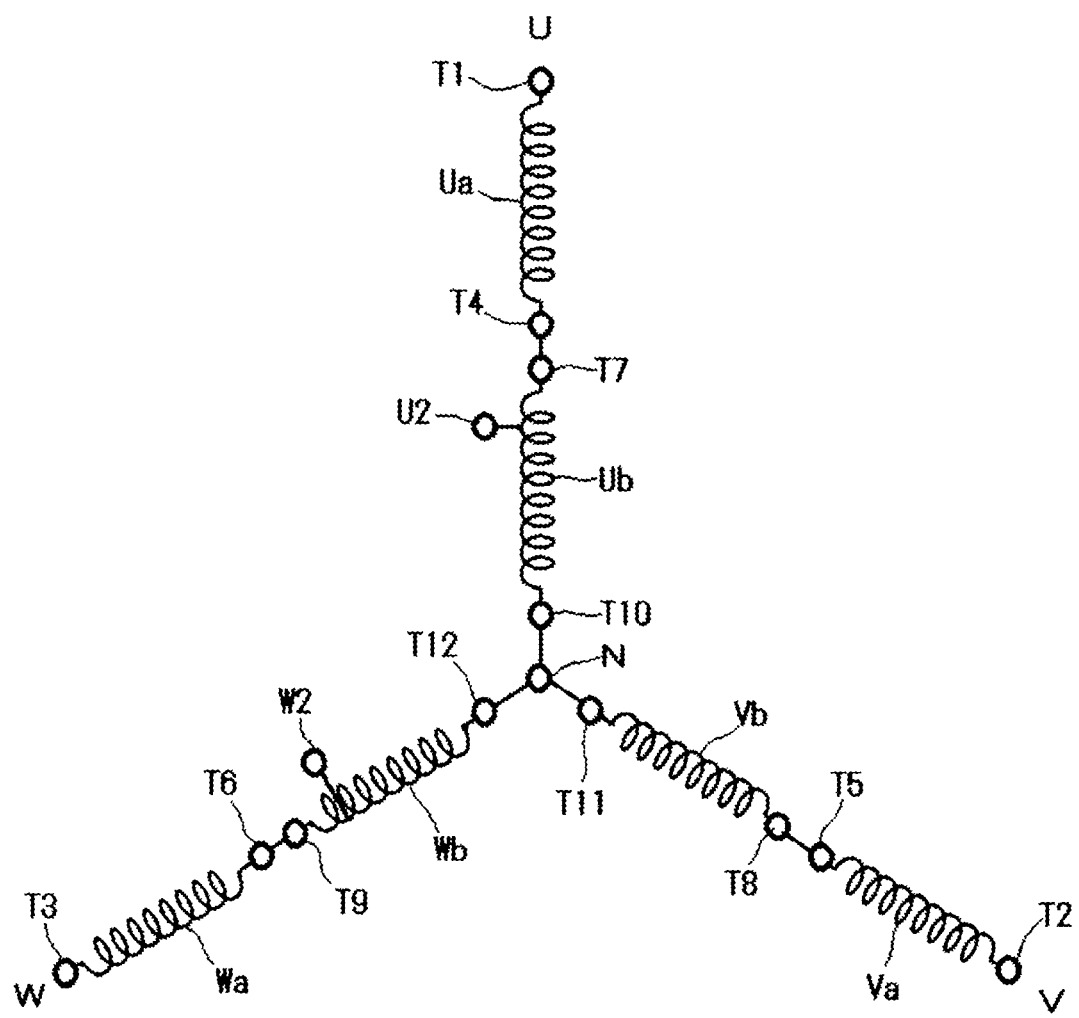
FIG. 3 is an explanatory diagram illustrating a wire connection pattern (high voltage three-phase alternating current) of armature coils.
Figure 4:
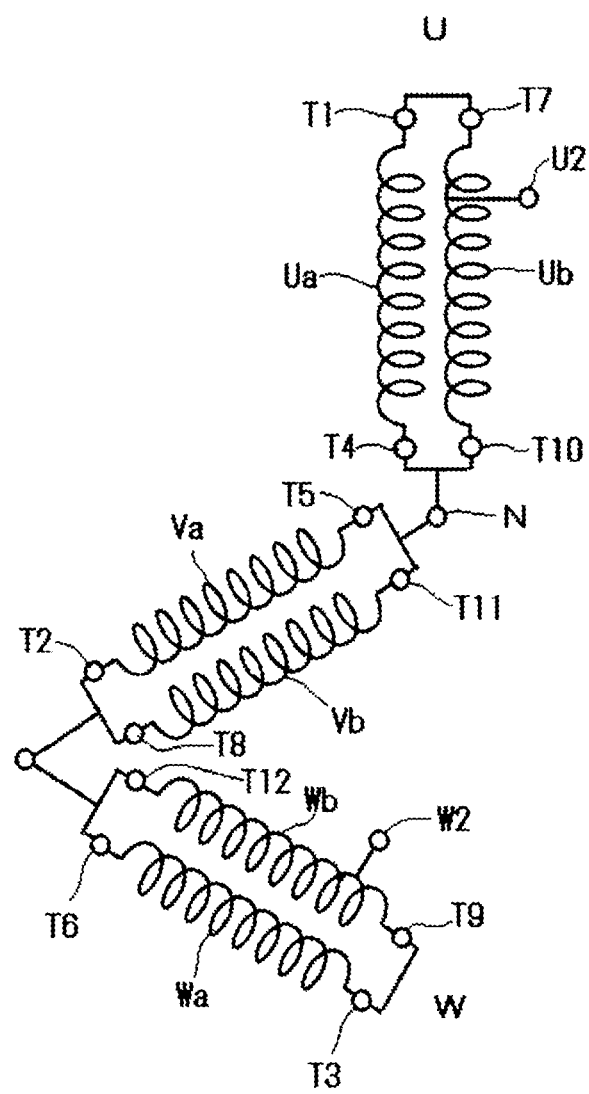
FIG. 4 is an explanatory diagram illustrating a wire connection pattern (single-phase alternating current) of armature coils.
Figure 5A:
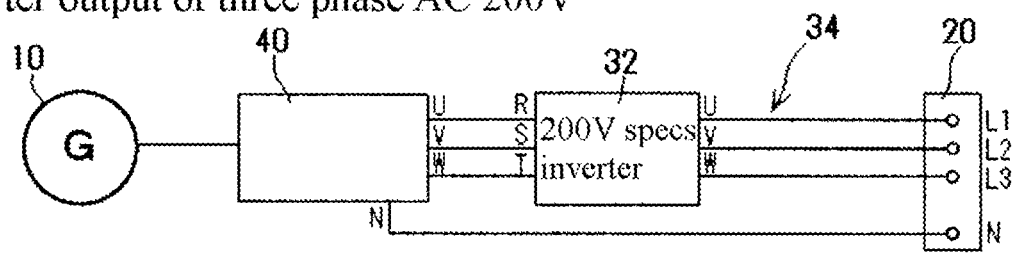
FIG. 5A is an explanatory diagram illustrating an example of an output format (three-phase alternating current inverter output of 200 V) that is selectable in Example 1 (including a single inverter compliant with 200 V specifications and using an output format selector switch having three switching positions).
Figure 5B:
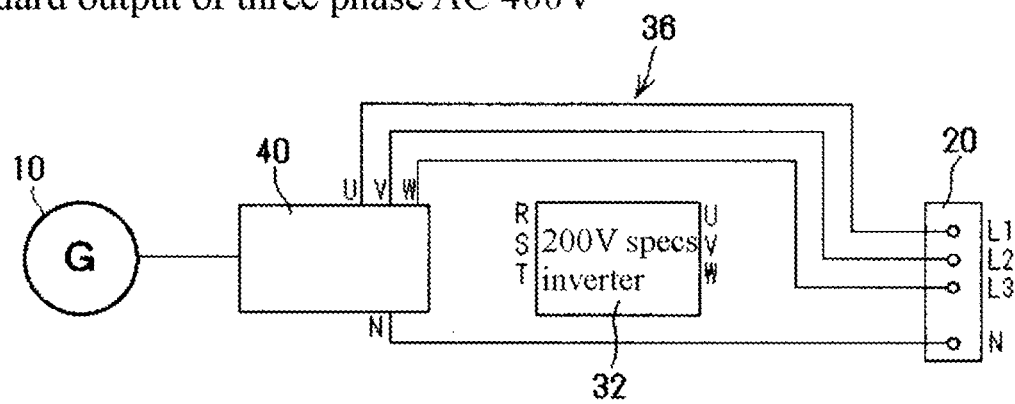
FIG. 5B is an explanatory diagram illustrating an example of an output format (three-phase alternating current standard output of 400 V) that is selectable in Example 1 (including a single inverter compliant with 200 V specifications and using an output format selector switch having three switching positions).
Figure 5C:
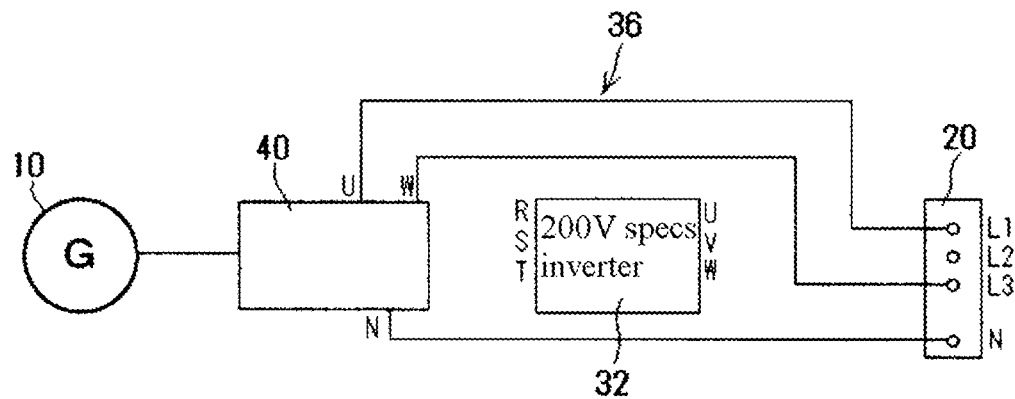
FIG. 5C is an explanatory diagram illustrating an example of an output format (single-phase alternating current standard output of 200 V/100 V) that is selectable in Example 1 (including a single inverter compliant with 200 V specifications and using an output format selector switch having three switching positions).
Figure 6A:
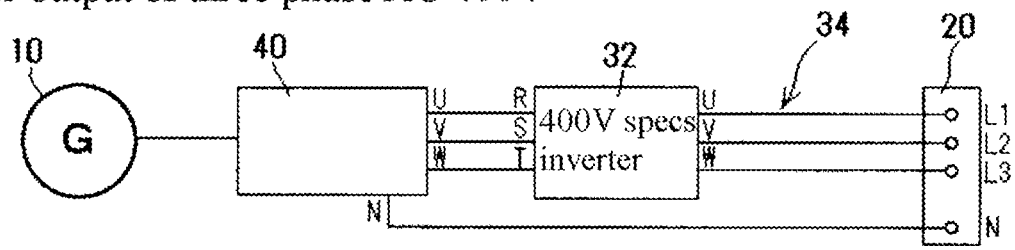
FIG. 6A is an explanatory diagram illustrating an example of an output format (three-phase alternating current inverter output of 400 V) that is selectable in Example 2 (including a single inverter compliant with 400 V specifications and using an output format selector switch having three switching positions).
Figure 6B:
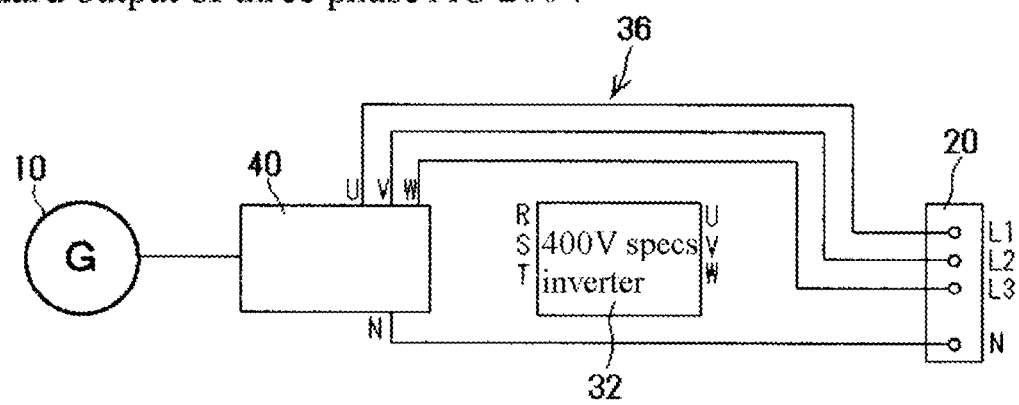
FIG. 6B is an explanatory diagram illustrating an example of an output format (three-phase alternating current standard output of 200 V) that is selectable in Example 2 (including a single inverter compliant with 400 V specifications and using an output format selector switch having three switching positions).
Figure 6C:
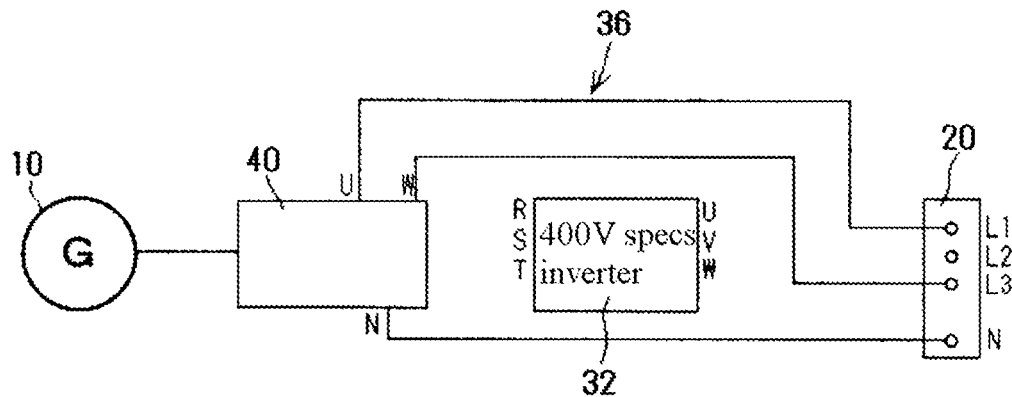
FIG. 6C is an explanatory diagram illustrating an example of an output format (single-phase alternating current standard output of 200 V/100 V) that is selectable in Example 2 (including a single inverter compliant with 400 V specifications and using an output format selector switch having three switching positions).
Figure 7A:
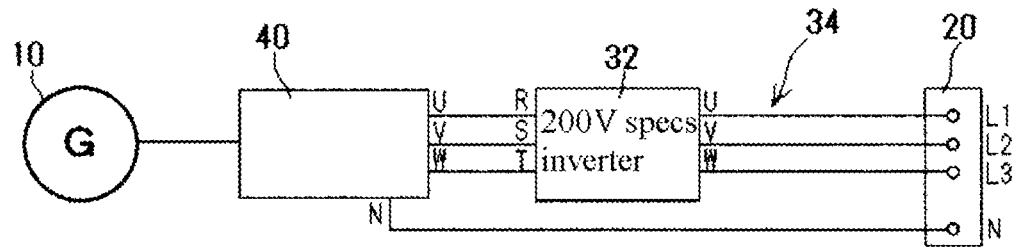
FIG. 7A is an explanatory diagram illustrating an example of an output format (three-phase alternating current inverter output of 200 V) that is selectable in Example 3 (including a single inverter compliant with 200 V specifications and using an output format selector switch having three switching positions).
Figure 7B:
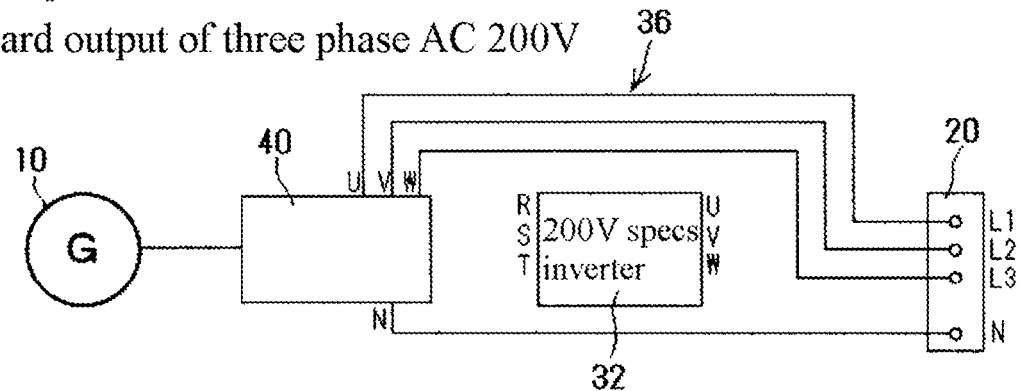
FIG. 7B is an explanatory diagram illustrating an example of an output format (three-phase alternating current inverter output of 200 V) that is selectable in Example 3 (including a single inverter compliant with 200 V specifications and using an output format selector switch having three switching positions).
Figure 7C:
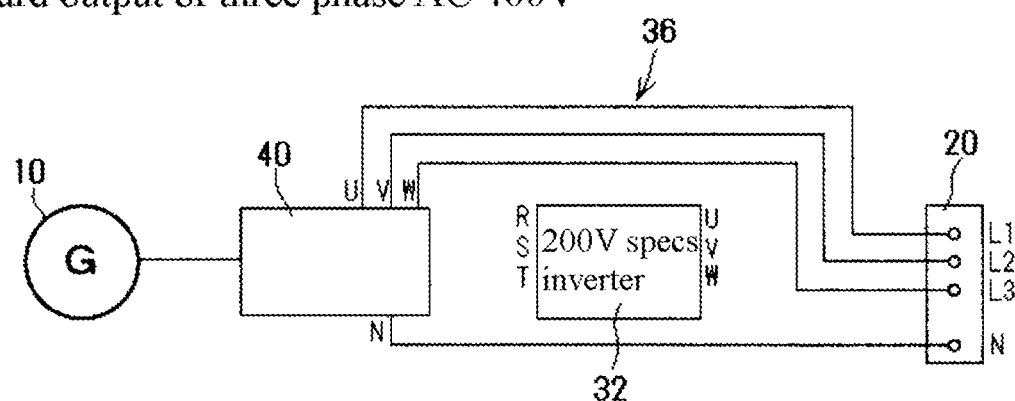
FIG. 7C is an explanatory diagram illustrating an example of an output format (three-phase alternating current standard output of 200 V) that is selectable in Example 3 (including a single inverter compliant with 200 V specifications and using an output format selector switch having three switching positions).
Figure 8A:
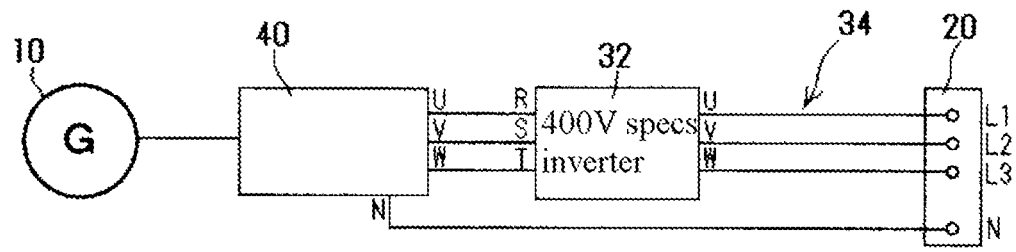
FIG. 8A is an explanatory diagram illustrating an example of an output format (three-phase alternating current inverter output of 400 V) that is selectable in Example 4 (including a single inverter compliant with 400 V specifications and using an output format selector switch having three switching positions).
Figure 8B:
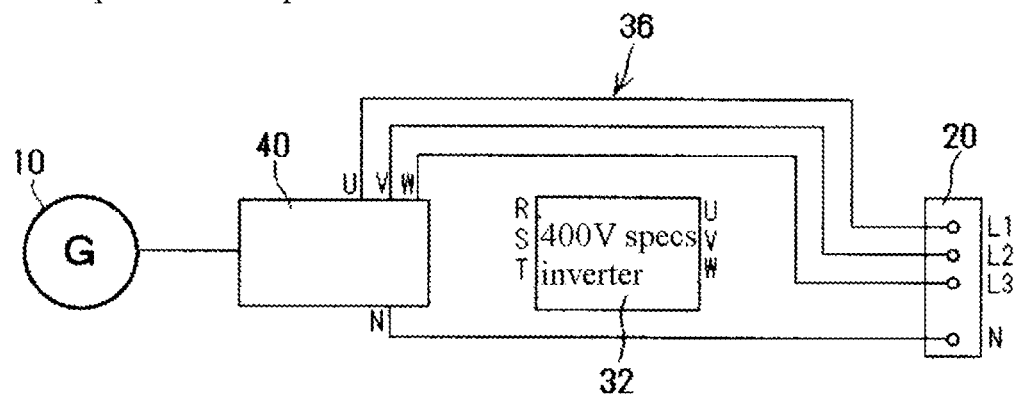
FIG. 8B is an explanatory diagram illustrating an example of an output format (three-phase alternating current standard output of 400 V) that is selectable in Example 4 (including a single inverter compliant with 400 V specifications and using an output format selector switch having three switching positions).
Figure 8C:
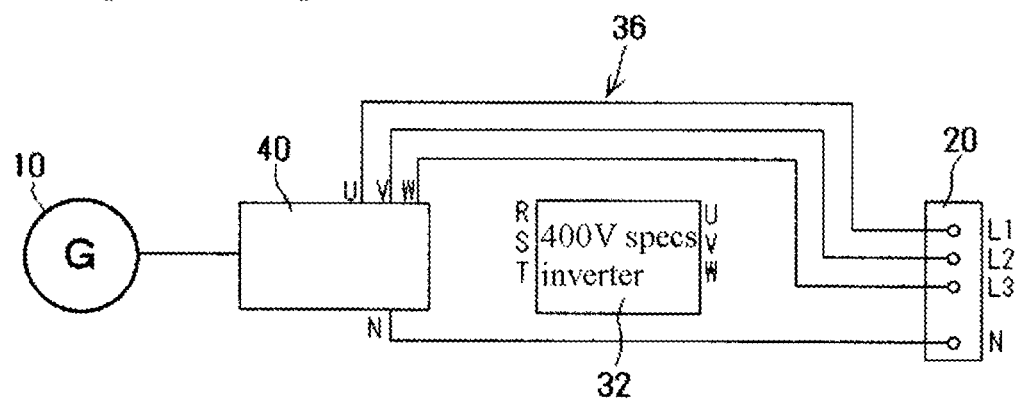
FIG. 8C is an explanatory diagram illustrating an example of an output format (three-phase alternating current standard output of 200 V) that is selectable in Example 4 (including a single inverter compliant with 400 V specifications and using an output format selector switch having three switching positions).
Figure 9A:
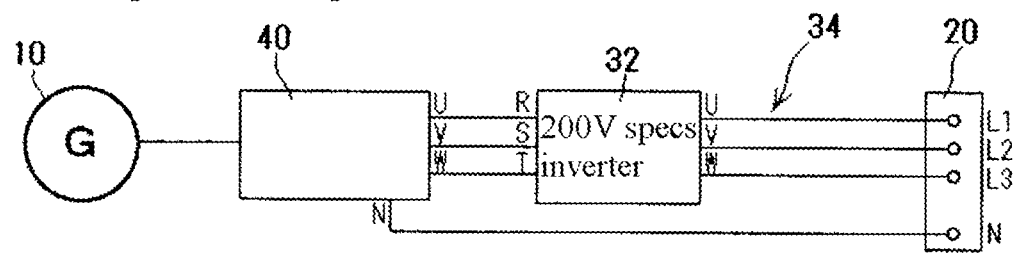
FIG. 9A is an explanatory diagram illustrating an example of an output format (three-phase alternating current inverter output of 200 V) that is selectable in Example 5 (including a single inverter compliant with 200 V specifications and using an output format selector switch having two switching positions).
Figure 9B:
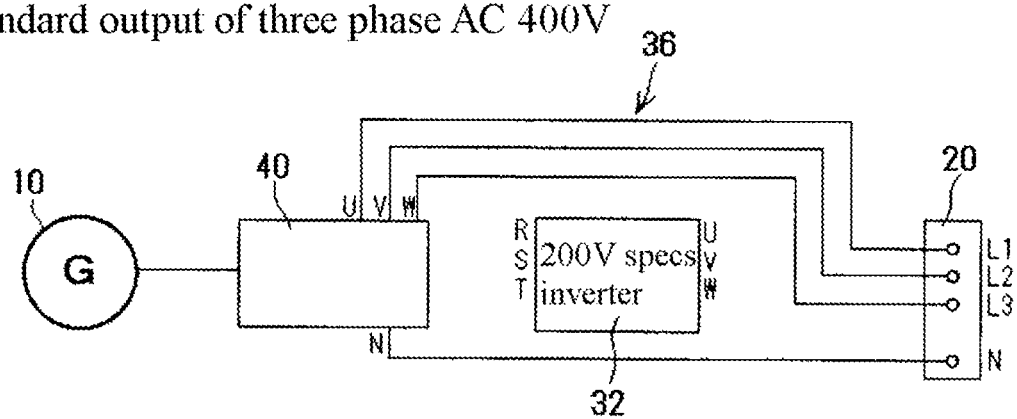
FIG. 9B is an explanatory diagram illustrating an example of an output format (three-phase alternating current standard output of 400 V) that is selectable in Example 5 (including a single inverter compliant with 200 V specifications and using an output format selector switch having two switching positions).
Figure 10A:
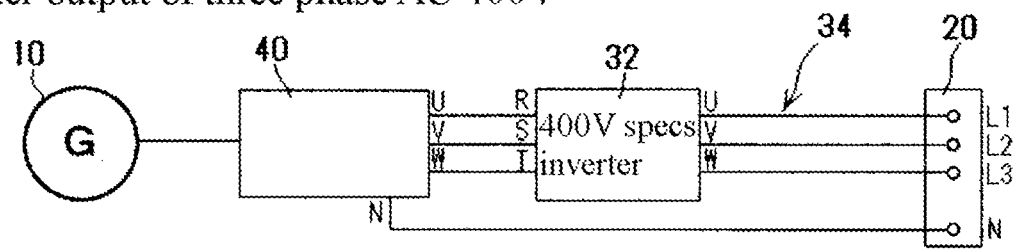
FIG. 10A is an explanatory diagram illustrating an example of an output format (three-phase alternating current inverter output of 400 V) that is selectable in Example 6 (including a single inverter compliant with 400 V specifications and using an output format selector switch having two switching positions).
Figure 10B:
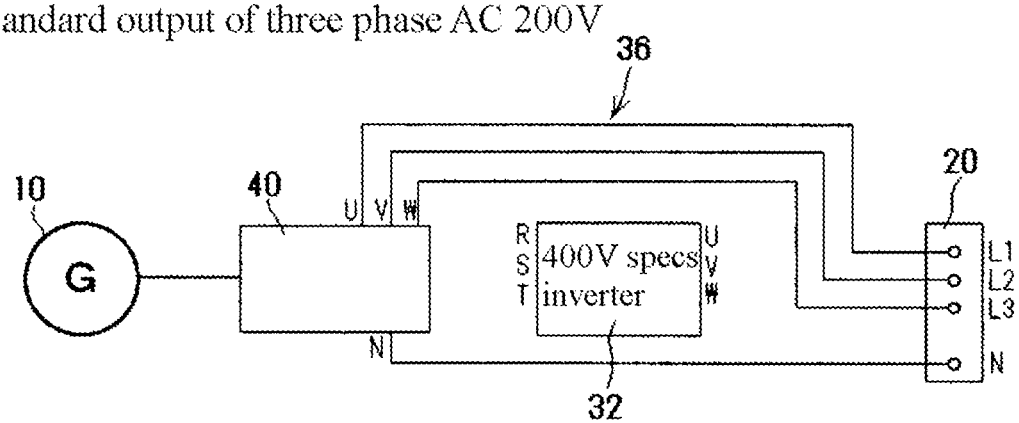
FIG. 10B is an explanatory diagram illustrating an example of an output format (three-phase alternating current standard output of 200 V) that is selectable in Example 6 (including a single inverter compliant with 400 V specifications and using an output format selector switch having two switching positions).
Figure 11A:
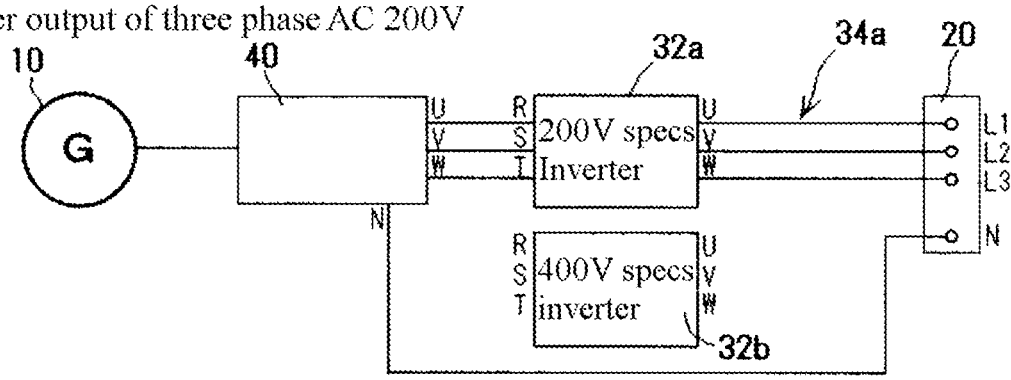
FIG. 11A is an explanatory diagram illustrating an example of an output format (three-phase alternating current inverter output of 200 V) that is selectable in Example 7 (including an inverter compliant with 200 V specifications and an inverter compliant with 400 V specifications and using an output format selector switch having four switching positions).
Figure 11B:
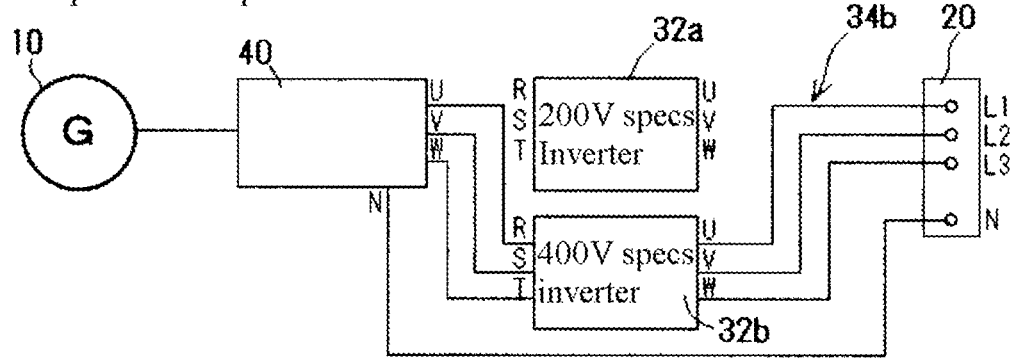
FIG. 11B is an explanatory diagram illustrating an example of an output format (three-phase alternating current inverter output of 400 V) that is selectable in Example 7 (including an inverter compliant with 200 V specifications and an inverter compliant with 400 V specifications and using an output format selector switch having four switching positions).
Figure 11C:
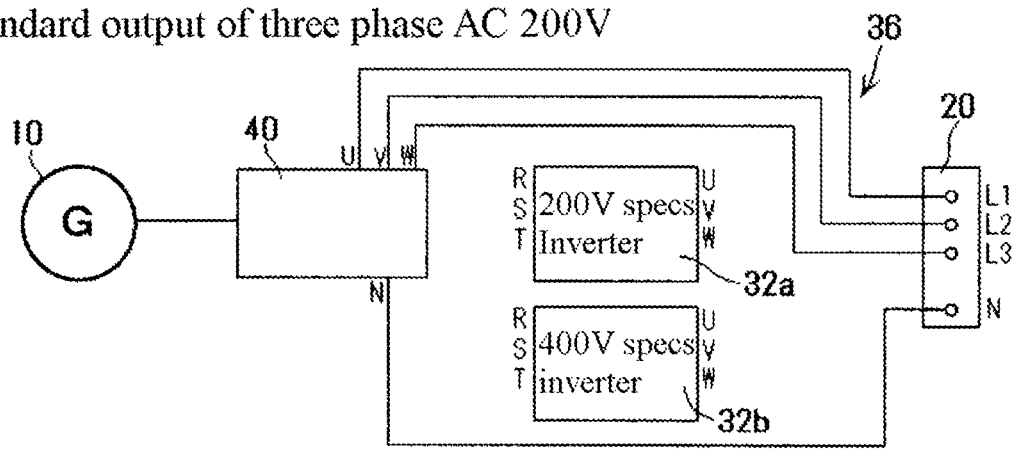
FIG. 11C is an explanatory diagram illustrating an example of an output format (three-phase alternating current standard output of 200 V) that is selectable in Example 7 (including an inverter compliant with 200 V specifications and an inverter compliant with 400 V specifications and using an output format selector switch having four switching positions).
Figure 11D:
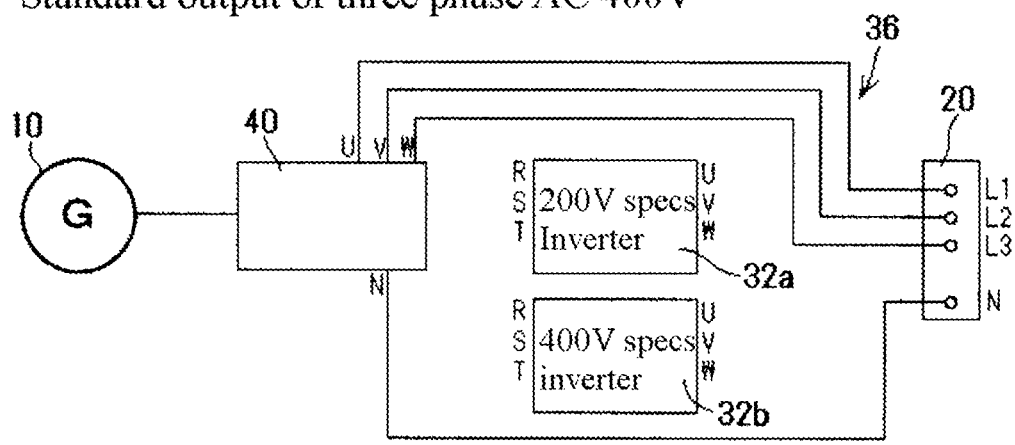
FIG. 11D is an explanatory diagram illustrating an example of an output format (three-phase alternating current standard output of 400 V) that is selectable in Example 7 (including an inverter compliant with 200 V specifications and an inverter compliant with 400 V specifications and using an output format selector switch having four switching positions).
Figure 12:
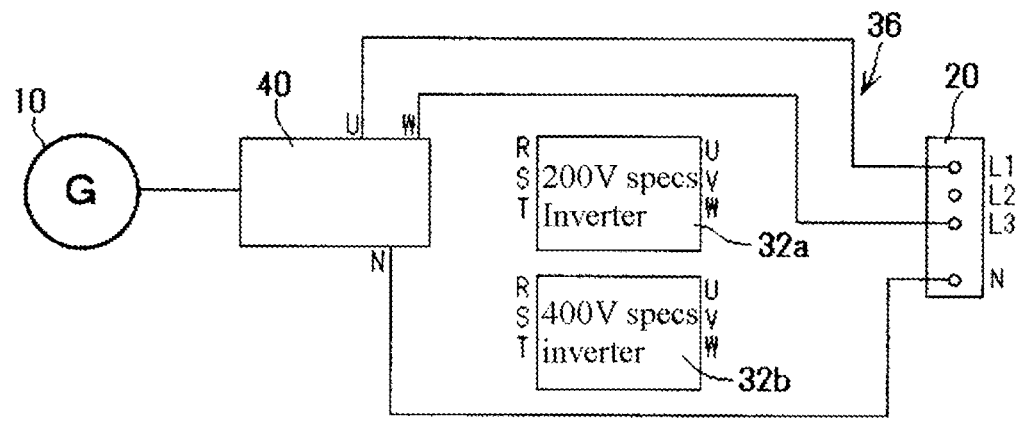
FIG. 12 is an explanatory diagram illustrating an output format (single-phase alternating current standard output of 200 V/100 V) that is selectable in Example 8 (including an inverter compliant with 200 V specifications and an inverter compliant with 400 V specifications and using an output format selector switch having five switching positions) in addition to FIG. 11A to FIG. 11D.

In the examples illustrated in FIG. 2 to FIG. 4, the U-phase armature consists of a pair of armature coils Ua and Ub, the V-phase armature consists of a pair of armature coils Va and Vb, and the W-phase armature consists of a pair of armature coils Wa and Wb. These armature coils have the same number of turns. The armature coil Ua has connection points T1 and T4 on both ends. The armature coil Ub has connection points T7 and T10 on both ends. The armature coil Va has connection points T2 and T5 on both ends. The armature coil Vb has connection points T8 and T11 on both ends. The armature coil Wa has connection points T3 and T6 on both ends. The armature coil Wb has connection points T9 and T12 on both ends. The armature coils can be connected to each other through the connection points T1 to T12.

Such a configuration allows electrical connections of the connection points T1 with T7, T4 with T10, T2 with T8, T5 with T11, T3 with T9, and T6 with T12 of the armature coils, and this allows parallel connections of the armature coils Ua to Ub, Va to Vb, and Wa to Wb. As a result, a wire connection pattern for outputting a three-phase alternating current of 200 V can be obtained when the parallelly connected armature coils Ua and Ub in the U phase, the parallelly connected armature coils Va and Vb in the V phase, and the parallelly connected armature coils Wa and Wb in the W phase form a star connection as illustrated in FIG. 2. In addition, when the parallelly connected armature coils in each phase are connected in series as illustrated in FIG. 4, it is possible to obtain a wire connection pattern for outputting a single-phase alternating current of 200 V/100 V.

In addition, when the connection points T4 and T7, T5 and T8, and T6 and T9 of the armature coils are electrically connected, it is possible to connect the armature coils Ua to Ub, Va to Vb, and Wa to Wb in series, and a wire connection pattern for outputting a three-phase alternating current of 400 V, which is twice the voltage of the wire connection pattern illustrated in FIG. 2, can be obtained when the serially connected armature coils form a star connection as illustrated in FIG. 3.

Note that, in the configuration examples illustrated in FIG. 2 to FIG. 4, the armature coil Ub is provided with an intermediate tap U2, and the armature coil Wb is provided with an intermediate tap W2 to extract a single-phase alternating current of 100 V even in the case of the wire connection pattern for outputting the three-phase alternating current of 200 V illustrated in FIG. 2 or the wire connection pattern for outputting the three-phase alternating current of 400 V illustrated in FIG. 3. As a result, outputs of the single-phase alternating current of 100 V can be obtained between a neutral point N and the intermediate tap U2, and the neutral point N and the intermediate tap W2.

[Output Circuit]

The electric power generated in the electric generator main body 10 configured as described above is supplied to the load connected to the three-phase output terminal block 20 through the output circuit 30 (see FIG. 1).

As illustrated in FIG. 1A, the output circuit 30 includes an inverter output circuit 34 and a standard output circuit 36. The inverter output circuit 34 includes an inverter 32. The standard output circuit 36 is configured to directly output an alternating current from the electric generator main body 10 to the load connected to the output terminal block 20 without the inverter 32. The output circuit 30 is configured to select an inverter output or a standard output by selecting the circuit 34 or 36 to connect the electric generator main body 10 to the three-phase output terminal block 20. The inverter output is an output of a three-phase alternating current subjected to a frequency conversion through the inverter 32. The standard output is a direct output of a three-phase alternating current from the electric generator main body 10.

Note that FIG. 1A illustrates a configuration example in which the output circuit only includes an inverter 32 compliant with 200 V specifications or an inverter 32 compliant with 400 V specifications, and selects the inverter output circuit 34 or the standard output circuit 36 to output a current.

Figure 1B:
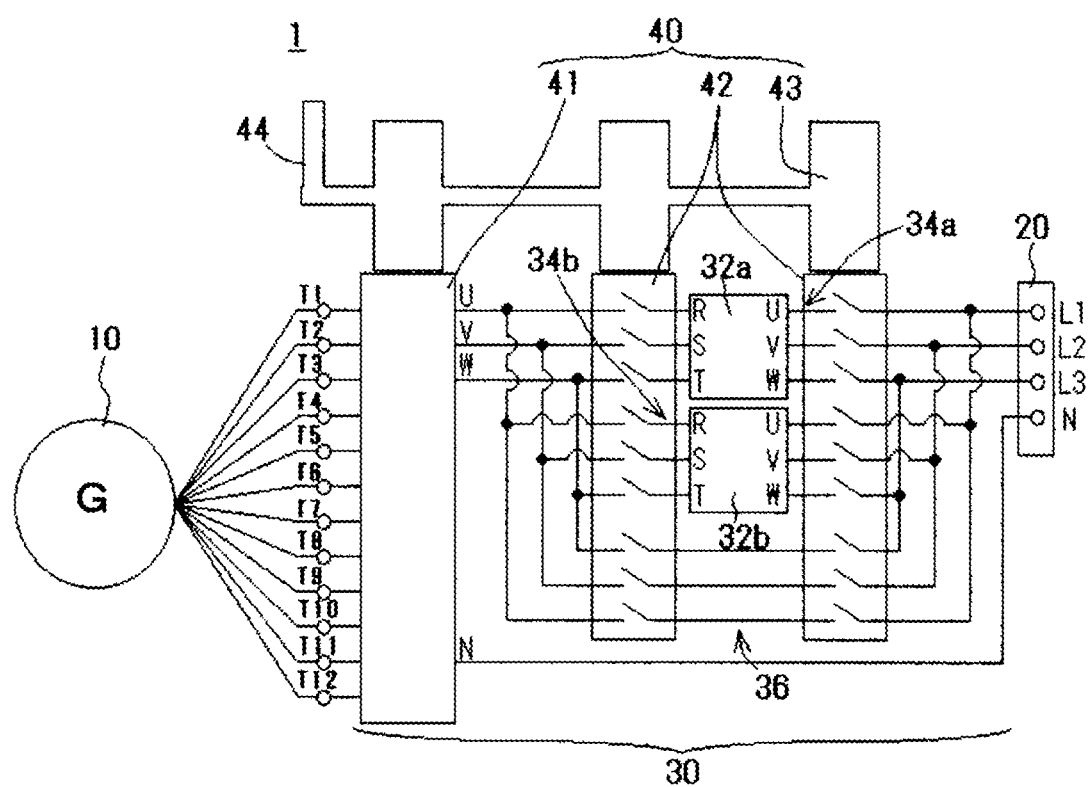
FIG. 1B is an explanatory diagram illustrating an embodiment of an output variable type electric generator including an inverter compliant with low voltage specifications and an inverter compliant with high voltage specifications according to the present invention.

On the other hand, as illustrated in FIG. 1B, the output circuit may include an inverter 32a compliant with low voltage (200 V) specifications and an inverter 32b compliant with high voltage (400 V) specifications as the inverters. The output circuit may include a low voltage inverter output circuit 34a including the inverter 32a compliant with 200 V specifications, a high voltage inverter output circuit 34b including the inverter 32b compliant with 400 V specifications, and the standard output circuit 36 bypassing both the inverters 32a and 32b if necessary, and select one of the output circuits.

[Output Format Selector Switch]

(1) Overview of Output Format Selector Switch

The above-described output circuit 30 provided between the electric generator main body 10 and the three-phase output terminal block 20 is provided with the output format selector switch 40.

As illustrated in FIG. 1A and FIG. 1B, the output format selector switch 40 includes a wire connection switching section 41, a connection switching section 42, and an interlocking mechanism 43 configured to cause the wire connection switching section 41 and the connection switching section 42 to interlock with each other.

The wire connection switching section 41 switches the wire connection pattern of the armature coils of the electric generator main body 10.

In addition, the connection switching section 42 performs a process of switching a circuit connecting the electric generator main body 10 to the three-phase output terminal block 20 between the inverter output circuit 34 and the standard output circuit 36 described above (in the example illustrated in FIG. 1B, among the low voltage inverter output circuit 34a, the high voltage inverter output circuit 34b, and the standard output circuit 36).

Moreover, the above-described interlocking mechanism 43 causes the wire connection switching section 41 and the connection switching section 42 to interlock with each other in such a manner that a correct combination of a wire connection pattern after being switched by the wire connection switching section 41 and an output circuit selected by the connection switching section 42 is achieved. This makes it possible to prevent the inverter 32 from receiving a voltage that is different from its specification voltage.

Table 1 below shows Example 1 to Example 8, each of which is an example of the number and specifications of the inverters 32 provided in the output circuit 30 and combinations of selectable output formats corresponding to the number of switching positions provided in the output format selector switch 40.

Note that, for the combinations of selectable output formats, a single-phase alternating current output of 200 V/100 V may be added to be selected in Example 3 to Example 6, for example. In addition, an option of a three-phase alternating current standard output of 200 V and/or 400 V may be excluded from Example 7 and Example 8. The combinations of adoptable output formats are not limited to Table 1.

TABLE 1

Selectable output format combination examples

| Ex. | Inverter spec. | Number of switching positions/output format | Armature coil wire connection pattern | Selected output circuit A numeral in brackets denotes a reference numeral in the drawings | Ref. Dwg. |
|---|---|---|---|---|---|
| Ex. 1 | 200 v (single inverter) | 3 | Three-phase 200 v inverter | Three-phase 200 v | Inverter (34) | 5 A |
| | | | Three-phase 400 v standard | Three-phase 400 v | Standard (36) | 5 B |
| | | | Single-phase 200 v/100 v | Single-phase | Standard (36) | 5 C |
| Ex. 2 | 400 v (single inverter) | 3 | Three-phase 400 v inverter | Three-phase 400 v | Inverter (34) | 6 A |
| | | | Three-phase 200 v standard | Three-phase 200 v | Standard (36) | 6 B |
| | | | Single-phase 200 v/100 v | Single-phase | Standard (36) | 6 C |
| Ex. 3 | 200 v (single inverter) | 3 | Three-phase 200 v inverter | Three-phase 200 v | Inverter (34) | 7 A |
| | | | Three-phase 200 v standard | Three-phase 200 v | Standard (36) | 7 B |
| | | | Three-phase 400 v standard | Three-phase 400 v | Standard (36) | 7 C |
| Ex. 4 | 400 v (single inverter) | 3 | Three-phase 400 v inverter | Three-phase 400 v | Inverter (34) | 8 A |
| | | | Three-phase 400 v standard | Three-phase 400 v | Standard (36) | 8 B |
| | | | Three-phase 200 v standard | Three-phase 200 v | Standard (36) | 8 C |
| Ex. 5 | 200 v (single inverter) | 2 | Three-phase 200 v inverter | Three-phase 200 v | Inverter (34) | 9 A |
| | | | Three-phase 400 v standard | Three-phase 400 v | Standard (36) | 9 B |
| Ex. 6 | 400 v (single inverter) | 2 | Three-phase 400 v inverter | Three-phase 400 v | Inverter (34) | 10 A |
| | | | Three-phase 200 v standard | Three-phase 200 v | Standard (36) | 10 B |
| Ex. 7 | 200 v + 400 v (two inverters) | 4 | Three-phase 200 v inverter | Three-phase 200 v | Low voltage inverter (34a) | 11 A |
| | | | Three-phase 400 v inverter | Three-phase 400 v | High voltage inverter (34b) | 11 B |
| | | | Three-phase 200 v standard | Three-phase 200 v | Standard (36) | 11 C |
| | | | Three-phase 400 v standard | Three-phase 400 v | Standard (36) | 11 D |

TABLE 1-continued

Selectable output format combination examples

| Ex. | Inverter spec. | Number of switching positions/output format | Armature coil wire connection pattern | Selected output circuit A numeral in brackets denotes a reference numeral in the drawings | Ref. Dwg. |
|---|---|---|---|---|---|
| Ex. 8 | 200 v + 400 v (two inverters) | 5 | Three-phase 200 v inverter | Three-phase 200 v | Low voltage inverter (34a) | 11 A |
| | | | Three-phase 400 v inverter | Three-phase 400 v | High voltage inverter (34b) | 11 B |
| | | | Three-phase 200 v standard | Three-phase 200 v | Standard (36) | 11 C |
| | | | Three-phase 400 v standard | Three-phase 400 v | Standard (36) | 11 D |
| | | | Single-phase 200 v/100 v | Single-phase | Standard (36) | 12 |

(2) Configuration Example of Output Format Selector Switch Including Cam Switch (Example 1)
(2-1) Overall Configuration of Cam Switch For example, a mechanical switch such as a cam switch may be used to form the above-described output format selector switch 40 configured to switch the wire connection pattern of the armature coils of the electric generator main body 10 and select an output circuit in a correct combination at the same time.

As an example, a configuration example in which the output format selector switch 40 for selecting the output format described in Example 1 of the above Table 1 is configured by a cam switch is described with reference to FIG. 13 to FIG. 15. However, the output format selector switch 40 is not limited to the configuration described below, and may be configured in various ways.

Figure 13A:
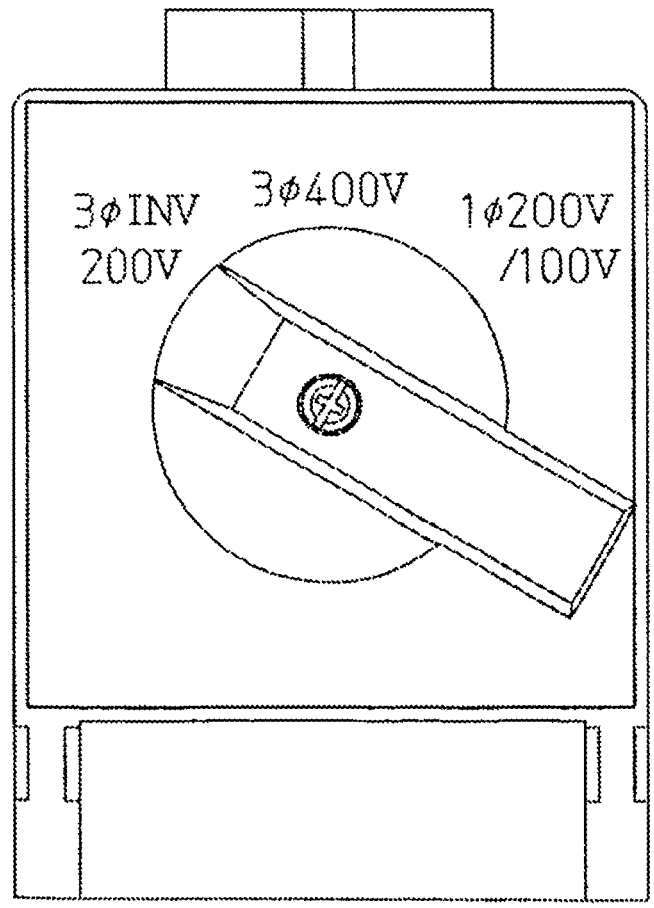
FIG. 13A is an explanatory diagram illustrating a configuration example of an output format selector switch (cam switch) that is adoptable in Example 1, and illustrating a switching position of a switching lever.
Figure 13B:
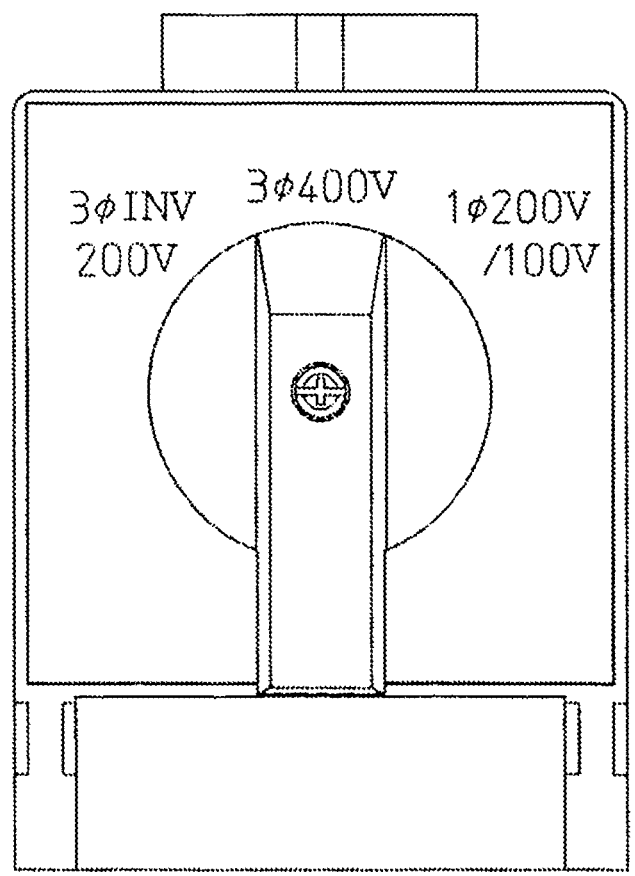
FIG. 13B is an explanatory diagram illustrating a configuration example of an output format selector switch (cam switch) that is adoptable in Example 1, and illustrating a switching position of a switching lever.
Figure 13C:
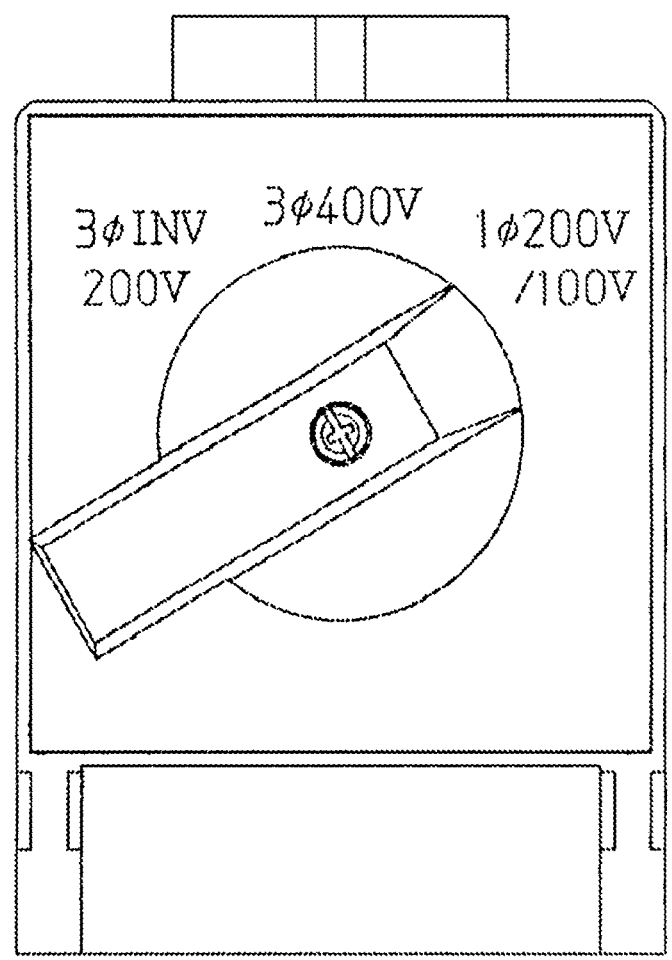
FIG. 13C is an explanatory diagram illustrating a configuration example of an output format selector switch (cam switch) that is adoptable in Example 1, and illustrating a switching position of a switching lever.
Figure 13D:
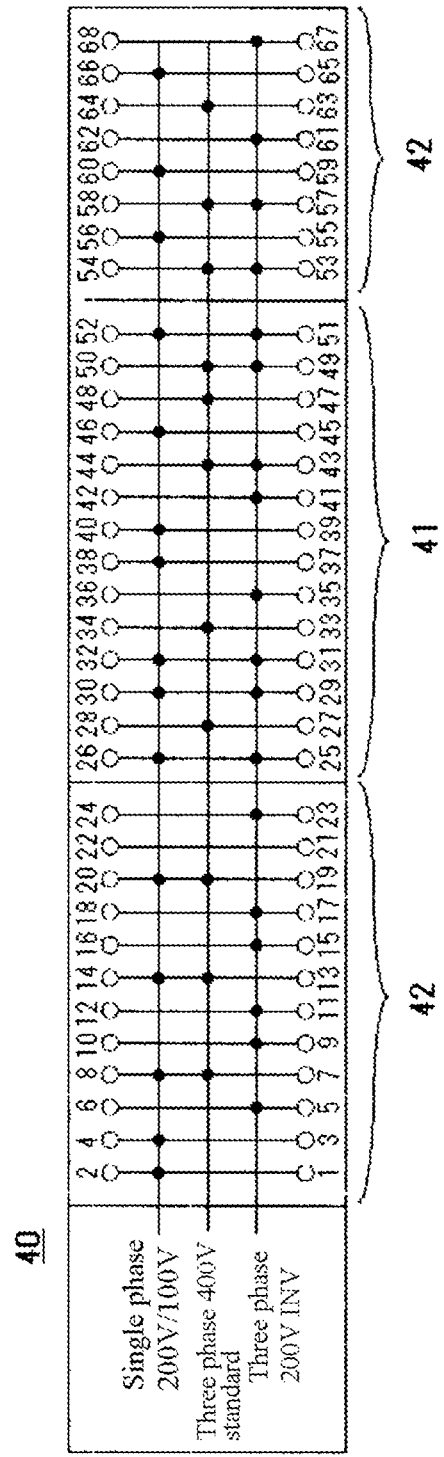
FIG. 13D is an explanatory diagram illustrating a configuration example of an output format selector switch (cam switch) that is adoptable in Example 1, and illustrating the output format selector switch (cam switch).

The cam switch adopted as the output format selector switch 40 in Example 1 has contacts Nos. 1 to 68 as illustrated in FIG. 13D, and includes the interlocking mechanism 43 (see FIG. 1) including a cam mechanism and the like for opening/closing operations between an odd-numbered contact and an even-numbered contact corresponding to this odd-numbered contact (obtained by adding one to the corresponding odd number) by operating a switching lever 44. This allows the cam switch to switch a connection state between the even-numbered contact and the odd-numbered contact in a predetermined combination in response to the switching position of the switching lever 44.

In this embodiment, among the contacts provided in the cam switch 40, the contacts Nos. 25 to 52 are allocated to the above-described wire connection switching section 41 for switching the wire connection pattern of the armature coils of the electric generator main body 10, and the contacts Nos. 1 to 24 and 53 to 68 are allocated to the above-described connection switching section 42.

In addition, the switching lever 44 is configured to switch among three positions including a switching position for selecting a three-phase alternating current inverter output of 200 V (FIG. 13A), a switching position for selecting a three-phase alternating current standard output of 400 V (FIG. 13B), and a switching position for selecting a single-phase alternating current output of 200 V/100 V (FIG. 13C), and the cam switch 40 is configured to electrically connect contacts in combinations shown in Table 2 below in response to the switching position of the switching lever 44.

TABLE 2

Combinations of contacts that are electrically connected at respective switching positions in cam switch according to Example 1

| Switching position of switching lever | Combination of contacts that are electrically connected | | |
|---|---|---|---|
| | Connection switching section (1-24) | Wire connection switching section (25-52) | Connection switching section (53-68) |
| Three-phase 200 v inverter output | 5-6<br>9-10<br>11-12<br>15-16<br>17-18<br>23-24 | 25-26<br>29-30<br>31-32<br>35-36<br>41-42<br>43-44<br>49-50<br>51-52 | 53-54<br>57-58<br>61-62<br>67-68 |
| Three-phase 400 v standard output | 7-8<br>13-14<br>19-20 | 27-28<br>33-34<br>43-44<br>47-48<br>49-50 | 53-54<br>57-58<br>63-64 |
| Single-phase 200 v/100 v output | 1-2<br>3-4<br>7-8<br>13-14<br>19-20 | 25-26<br>29-30<br>31-32<br>37-38<br>39-40<br>45-46<br>51-52 | 55-56<br>59-60<br>65-66 |

(2-2) Wire Connection Switching Section (Contacts Nos. 25 to 52)

Figure 14:
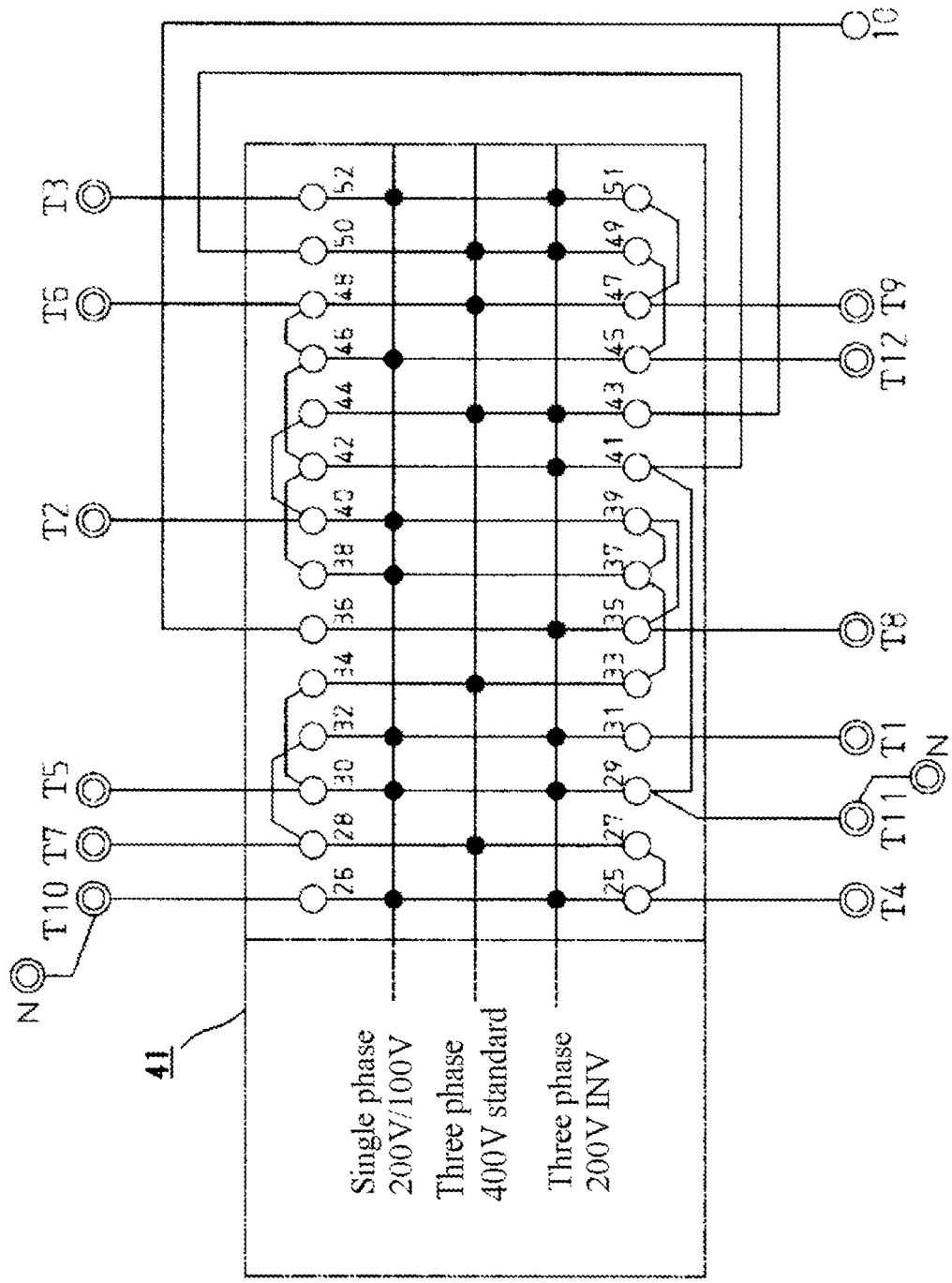
FIG. 14 is an explanatory diagram illustrating a configuration example of an output format selector switch (cam switch) that is adoptable in Example 1, and illustrating a wire connection switching section.

FIG. 14 is an enlarged diagram of the contacts Nos. 25 to 52 allocated to the wire connection switching section 41 of the cam switch 40 illustrated in FIG. 13D.

In the wire connection switching section 41, a short circuit is caused between the contacts Nos. 25 and 27, Nos. 28 and 32, Nos. 29, 41, and 50, Nos. 30 and 34, Nos. 33, 37, 39, and 35, Nos. 38, 42, 46, and 48, Nos. 40 and 44, Nos. 45 and 49, Nos. 47 and 51, and Nos. 43 and 36. In addition, the contacts Nos. 43 and 36 are connected to the contact No. 10 of the connection switching section 42 described later.

In addition, the connection points T1 to T12 provided in the armature coils Ua, Ub, Va, Vb, Wa, and Wb are connected to contacts of the wire connection switching section 41 as described below.

The connection point T1 of the armature coil Ua is connected to the contact No. 31 of the wire connection switching section.

The connection point T4 of the armature coil Ua is connected to the contact No. 25 of the wire connection switching section.

The connection point T7 of the armature coil Ub is connected to the contact No. 28 of the wire connection switching section.

The connection point T10 of the armature coil Ub is connected to the contact No. 26 of the wire connection switching section.

The connection point T2 of the armature coil Va is connected to the contact No. 40 of the wire connection switching section.

The connection point T5 of the armature coil Va is connected to the contact No. 30 of the wire connection switching section.

The connection point T8 of the armature coil Vb is connected to the contact No. 35 of the wire connection switching section.

The connection point T11 of the armature coil Vb is connected to the contact No. 29 of the wire connection switching section.

The connection point T3 of the armature coil Wa is connected to the contact No. 52 of the wire connection switching section.

The connection point T6 of the armature coil Wa is connected to the contact No. 48 of the wire connection switching section.

The connection point T9 of the armature coil Wb is connected to the contact No. 47 of the wire connection switching section.

The connection point T12 of the armature coil Wb is connected to the contact No. 45 of the wire connection switching section.

(2-3) Connection Switching Section (Contacts Nos. 1 to 24 and 53 to 68)

The contacts Nos. 1 to 24 and 53 to 68 of the cam switch 40 are allocated to the connection switching section 42 configured to switch the connection of the electric generator main body 10 with the three-phase output terminal block 20 to a connection through the inverter output circuit 34 or the standard output circuit 36.

Figure 15:
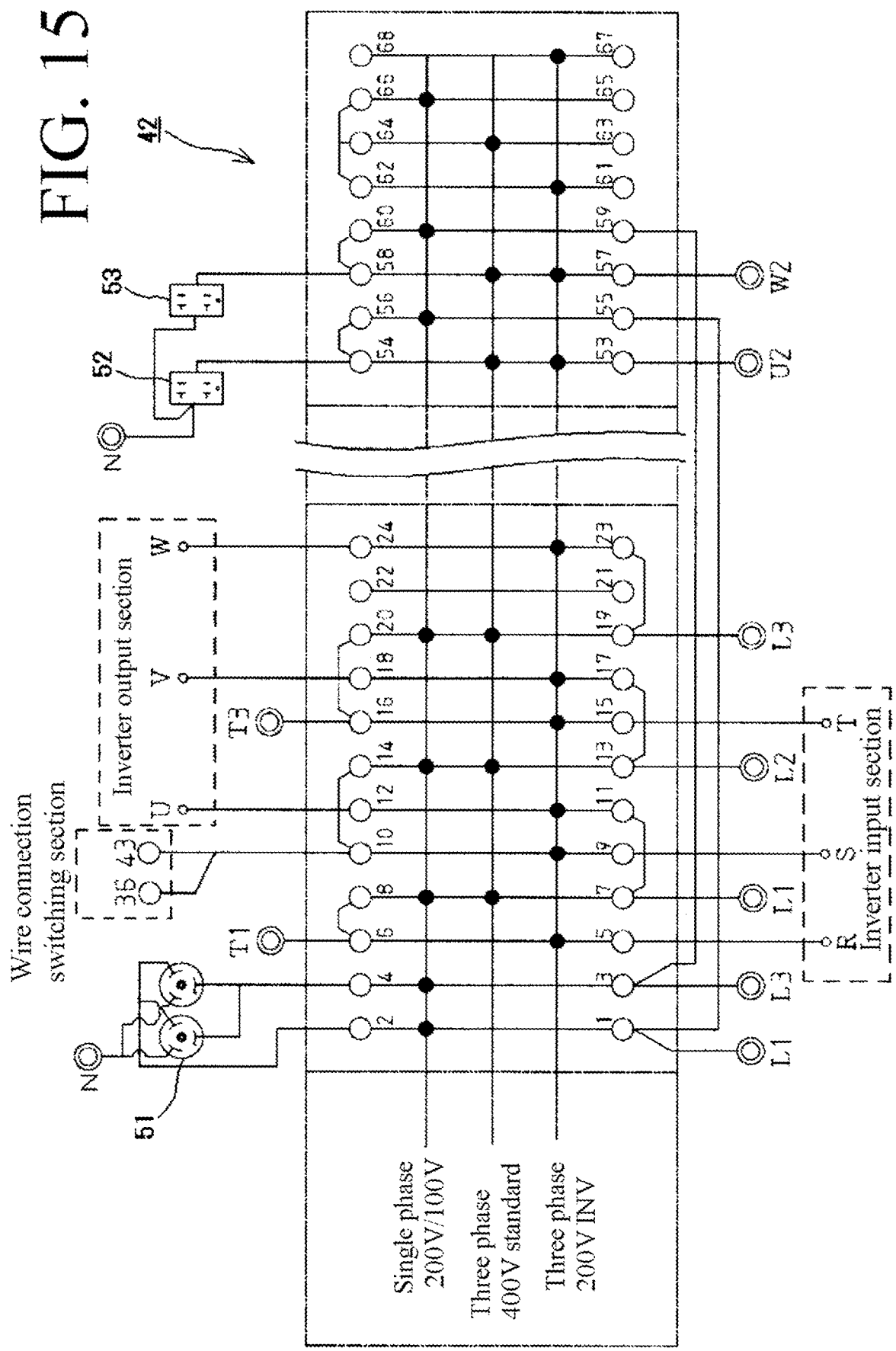
FIG. 15 is an explanatory diagram illustrating a configuration example of an output format selector switch (cam switch) that is adoptable in Example 1, and illustrating a connection switching section.
Figure 16A:
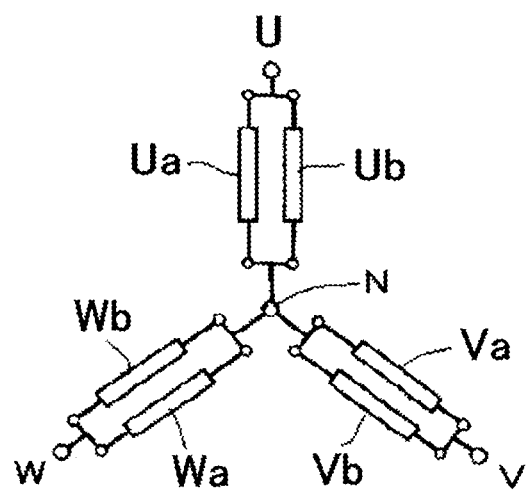
FIG. 16A is an explanatory diagram illustrating a wire connection pattern (low voltage three-phase alternating current output) of armature coils.
Figure 16B:
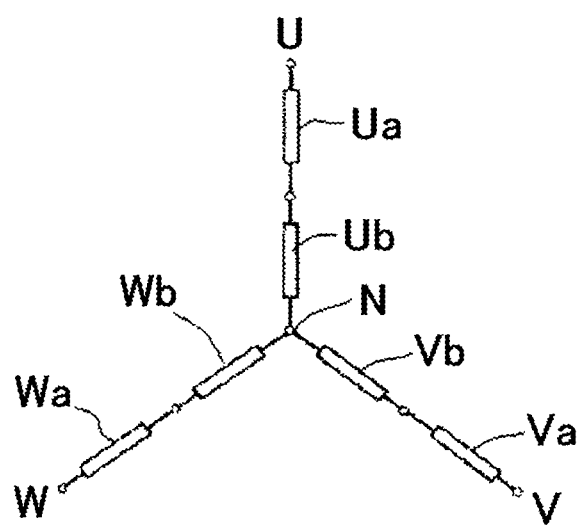
FIG. 16B is an explanatory diagram illustrating a wire connection pattern (high voltage three-phase alternating current output) of armature coils.
Figure 16C:
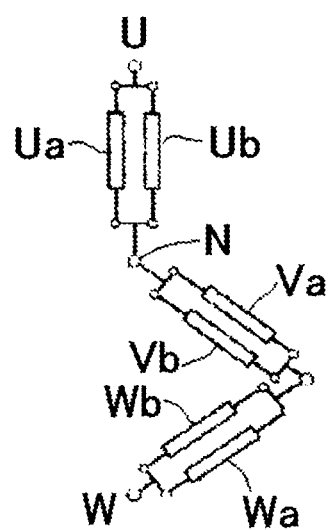
FIG. 16C is an explanatory diagram illustrating a wire connection pattern (single-phase alternating current output) of armature coils.
Figure 17A:
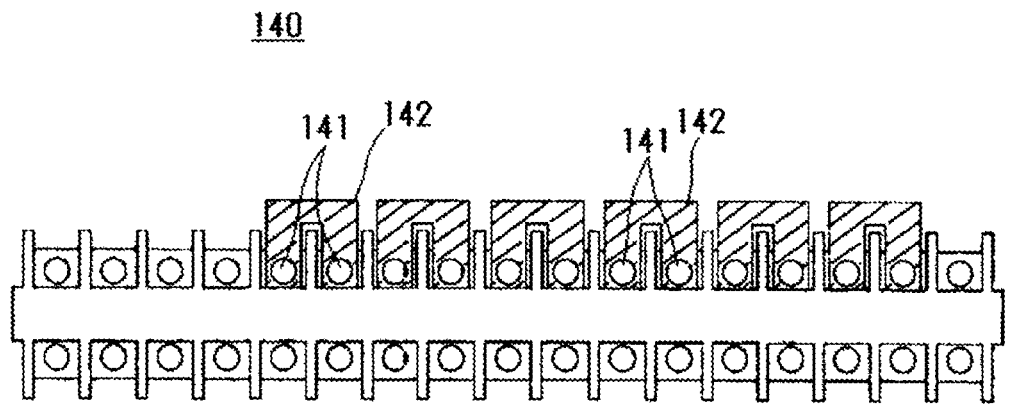
FIG. 17A is an explanatory diagram illustrating a terminal strip (related art) used for switching a wire connection pattern of armature coils, and illustrating a state before short circuit plates are rearranged.
Figure 17A:
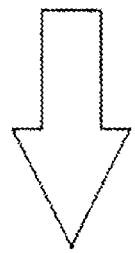
Figure 17B:
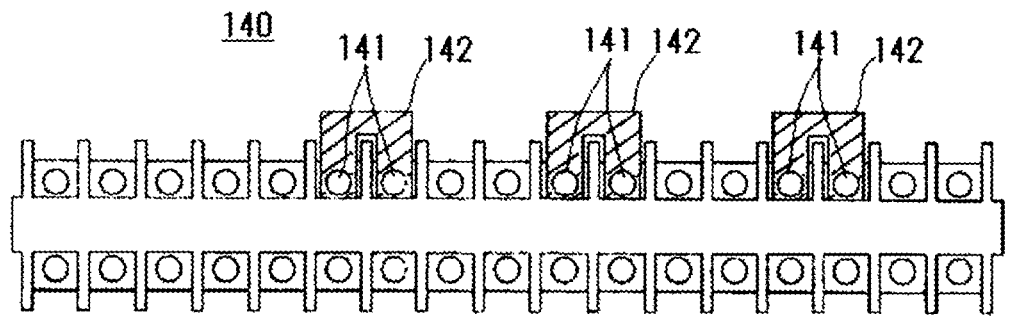
FIG. 17B is an explanatory diagram illustrating a terminal strip (related art) used for switching a wire connection pattern of armature coils, and illustrating a state after short circuit plates are rearranged.

As illustrated in FIG. 15, a short circuit is caused between the contacts Nos. 1 and 55, Nos. 3 and 59, Nos. 6 and 8, Nos. 7 and 11, Nos. 10 and 14, Nos. 13 and 17, Nos. 16 and 20, Nos. 19 and 23, Nos. 54 and 56, Nos. 58 and 60, and Nos. 62, 64, and 66 among the contacts of the connection switching section 42.

In addition, the connection points of the armature coils Ua and Ub, Va and Vb, and Wa and Wb, the contacts of the wire connection switching section 41, the three-phase output terminal block 20, and outlets 51 to 53 for a single-phase output are connected to the contacts of the connection switching section 42 in the following combinations.

The connection point T1 of the armature coil Ua is connected to the contact No. 6 of the connection switching section 42.

The connection point T3 of the armature coil Wa is connected to the contact No. 16 of the connection switching section 42.

The intermediate tap U2 of the armature coil Ub is connected to the contact No. 53 of the connection switching section 42.

The intermediate tap W2 of the armature coil Wb is connected to the contact No. 57 of the connection switching section 42.

A terminal L1 of the three-phase output terminal block 20 is connected to the contacts Nos. 1 and 7 of the connection switching section 42.

A terminal L2 of the three-phase output terminal block 20 is connected to the contact No. 13 of the connection switching section 42.

A terminal L3 of the three-phase output terminal block 20 is connected to the contacts Nos. 3 and 19 of the connection switching section 42.

An input terminal R of the inverter 32 is connected to the contact No. 5 of the connection switching section 42.

An input terminal S of the inverter 32 is connected to the contact No. 9 of the connection switching section 42.

An input terminal T of the inverter 32 is connected to the contact No. 15 of the connection switching section 42.

An output terminal U of the inverter 32 is connected to the contact No. 12 of the connection switching section 42.

An output terminal V of the inverter 32 is connected to the contact No. 18 of the connection switching section 42.

An output terminal W of the inverter 32 is connected to the contact No. 24 of the connection switching section 42.

The contacts Nos. 36 and 43 of the wire connection switching section 41 are connected to the contact No. 10 of the connection switching section 42.

The single-phase 200 V outlet 51 is connected to the contacts Nos. 2 and 4 of the connection switching section 42.

The first single-phase 100 V outlet 52 is connected to the contact No. 54 of the connection switching section 42.

The second single-phase 100 V outlet 53 is connected to the contact No. 58 of the connection switching section 42.

(2-4) Description of Switching Operation Using Cam Switch

The cam switch 40 configured as described above causes the wire connection switching section 41 to switch the wire connection pattern of the armature coils of the electric generator main body 10 and the connection switching section 42 to switch a connection using the inverter output circuit 34 or the standard output circuit 36, in tandem with each other by operating the switching lever 44 as described below.

(2-4-1) Case where Three-Phase Alternating Current Inverter Output of 200 V is Selected When the switching position of the switching lever 44 is the position illustrated in FIG. 13A and the three-phase alternating current inverter output of 200 V is selected, the contacts Nos. 25 and 26 and Nos. 31 and 32 of the wire connection switching section 41 illustrated in FIG. 14 are connected as shown in Table 2. Therefore, the connection points T4 and T10, and T1 and T7 of the armature coil are connected, and this allows a parallel connection of the armature coils Ua and Ub.

In addition, the contacts Nos. 29 and 30 of the wire connection switching section 41 are connected, the contacts Nos. 43 and 44 are connected, and the contacts Nos. 35 and 36 are connected. Therefore, the connection points T5 and T11, and T2 and T8 of the armature coil are connected, and this allows a parallel connection of the armature coils Va and Vb. In addition, the connection point T2 is connected to the contact No. 10 of the connection switching section described later.

Moreover, the contacts Nos. 41 and 42 and Nos. 51 and 52 of the wire connection switching section 41 are connected. Therefore, the connection points T6 and T12, and T3 and T9 of the armature coil are connected, and this allows a parallel connection of the armature coils Wa and Wb.

In addition, the contacts Nos. 49 and 50 of the wire connection switching section 41 are connected. Therefore, the connection point T11 of the armature coil Vb is connected to the connection point T12 of the armature coil Wb.

As illustrated in FIG. 14, the connection point T11 of the armature coil Vb connected to the connection point T12 of the armature coil Wb is connected to a terminal N of the three-phase output terminal block 20. In addition, the connection point T10 of the armature coil Wb is also connected to the terminal N of the three-phase output terminal block 20. Therefore, the connection points T10, T11, and T12 are electrically connected.

As a result, the armature coils of the electric generator main body 10 are switched to the wire connection pattern of the three-phase alternating current of 200 V illustrated in FIG. 2.

When the three-phase alternating current inverter output of 200 V is selected by the switching lever 44, the contact No. 43 of the wire connection switching section 41 is connected to the connection point T2 (V phase) of the armature coil Va through the contacts Nos. 44 and 40. Therefore, the contact No. 10 of the connection switching section 42 connected to the contact No. 43 of the wire connection switching section 41 is electrically connected to the connection point T2 (V phase) of the armature coil Va.

In addition, as illustrated in FIG. 15, the contact No. 6 of the connection switching section 42 is connected to the connection point T1 (U phase) of the armature coil Ua, and the contact No. 16 of the connection switching section 42 is connected to the connection point T3 (W phase) of the armature coil Wa.

In addition, when the three-phase alternating current inverter output of 200 V is selected, the contacts Nos. 5 and 6, Nos. 9 and 10, and Nos. 15 and 16 of the connection switching section 42 are electrically connected (see Table 2).

As a result, the connection point T1 (U phase) of the armature coil Ua connected to the contact No. 6 is connected to the input terminal R of the inverter 32 connected to the contact No. 5, the connection point T2 (V phase) of the armature coil Va connected to the contact No. 10 is connected to the input terminal S of the inverter 32 connected to the contact No. 9, and the connection point T3 (W phase) of the armature coil Wa connected to the contact No. 16 is connected to the input terminal T of the inverter 32 connected to the contact No. 15. Therefore, the three-phase alternating current of 200 V output from the electric generator main body 10 is input to the inverter 32 compliant with 200 V specifications (see Table 2).

As illustrated in FIG. 15, the output terminal U of the inverter 32 is connected to the contact No. 12 of the connection switching section 42, the output terminal V of the inverter 32 is connected to the contact No. 18 of the connection switching section 42, and the output terminal W of the inverter 32 is connected to the contact No. 24 of the connection switching section 42. In addition, when the three-phase alternating current inverter output of 200 V is selected, the contacts Nos. 12 and 11, Nos. 18 and 17, and Nos. 24 and 23 are electrically connected.

In addition, the contact No. 7 that is short-circuited with the contact No. 11 is connected to the terminal L1 of the three-phase output terminal block 20, the contact No. 13 that is short-circuited with the contact No. 17 is connected to the terminal L2 of the three-phase output terminal block 20, and the contact No. 19 that is short-circuited with the contact No. 23 is connected to the terminal L3 of the three-phase output terminal block 20. As a result, it is possible to extract, from the three-phase output terminal block 20, the three-phase alternating current of 200 V converted to a predetermined frequency by the inverter 32.

In addition, when the three-phase alternating current inverter output of 200 V is selected, the contact No. 54 of the connection switching section 42 is electrically connected to the contact No. 53 to which the intermediate tap U2 provided in the armature coil Ub is connected, and the contact No. 58 of the connection switching section 42 is electrically connected to the contact No. 57 to which the intermediate tap W2 provided in the armature coil Wb is connected (see Table 2).

As a result, one of terminals of the first single-phase 100 V outlet 52 connected to the contact No. 54 and the second single-phase 100 V outlet 53 connected to the contact No. 58 is connected to the intermediate tap U2 of the armature coil Ub and the intermediate tap W2 of the armature coil Wb, respectively.

The other terminals of the first single-phase 100 V outlet 52 and the second single-phase 100 V outlet 53 are connected to the connection points T10, T11, and T12 of the armature coils through the terminal N provided in the three-phase output terminal block 20, that is, these are connected to the neutral point N of the star connection illustrated in FIG. 2.

This makes it possible to extract the single-phase 100 V alternating current generated between the neutral point N and the intermediate tap U2 from the first single-phase 100 V outlet 52. In addition, it is possible to extract the single-phase alternating current of 100 V generated between the neutral point N and the intermediate tap W2 from the second single-phase 100 V outlet 53.

On the other hand, when the three-phase alternating current inverter output of 200 V is selected, the contacts Nos. 2 and 4 of the connection switching section 42 to which the single-phase 200 V outlet is connected are not electrically connected to the other contacts. Therefore, the single-phase 200 V outlet is unavailable.

(2-4-2) Case where Three-Phase Alternating Current Standard Output of 400 V is Selected The contacts Nos. 27 and 28 of the wire connection switching section 41 are connected when the switching lever 44 of the cam switch 40 is moved to the position illustrated in FIG. 13B and the three-phase alternating current standard output of 400 V is selected. This makes it possible to connect the connection points T4 and T7 of the wire connection switching section 41 illustrated in FIG. 14, and connect the armature coils Ua and Ub in series.

In addition, when the contacts Nos. 33 and 34 of the wire connection switching section 41 are connected, the connection points T5 and T8 are connected, and the armature coils Va and Vb are connected in series.

Moreover, when the contacts Nos. 47 and 48 of the wire connection switching section 41 are connected, the connection points T9 and T6 are connected, and the armature coils Wa and Wb are connected in series.

In addition, when the contacts Nos. 49 and 50 of the wire connection switching section 41 are connected, the connection point T11 of the armature coil Vb is connected to the connection point T12 of the armature coil Wb.

Both the connection point T11 of the armature coil Vb and the connection point T10 of the armature coil Ua are connected to the terminal N of the three-phase output terminal block 20, and are electrically connected.

As a result, the wire connection pattern of the armature coils of the electric generator main body 10 is switched to the wire connection pattern of the three-phase alternating current of 400 V illustrated in FIG. 3, which is the star connection in which the armature coils Ua and Ub, Va and Vb, and Wa and Wb in each phase are connected in series.

In addition, when the contact No. 43 of the wire connection switching section 41 is electrically connected to the contacts Nos. 44 and 40, the connection point T2 (V phase) of the armature coil Va is connected to the contact No. 10 of the connection switching section 42.

Moreover, the contact No. 6 of the connection switching section 42 is connected to the connection point T1 (U phase) of the armature coil Ua, and the contact No. 16 of the connection switching section 42 is connected to the connection point T3 (W phase) of the armature coil Wa.

When the three-phase alternating current standard output of 400 V is selected, the contacts Nos. 5 and 6, Nos. 9 and 10, and Nos. 15 and 16 are electrically disconnected. Therefore, the input terminal R of the inverter 32 connected to the contact No. 5 is electrically disconnected from the connection point T1 (U phase) of the armature coil, the input terminal S of the inverter 32 connected to the contact No. 9 is electrically disconnected from the connection point T2 (V phase) of the armature coil, and the input terminal T of the inverter 32 connected to the contact No. 15 is electrically disconnected from the connection point T3 (W phase) of the armature coil. As a result, it is possible to prevent the inverter 32 compliant with 200 V specifications (see Table 1) from receiving the three-phase alternating current of 400 V generated in the electric generator main body 10.

On the other hand, when the three-phase alternating current standard output of 400 V is selected, the contact No. 8 that is short-circuited with the contact No. 6 to which the connection point T1 (U phase) of the armature coil Ua is connected is electrically connected to the contact No. 7 to which the terminal L1 of the three-phase output terminal block 20 is connected. In addition, the contact No. 14 that is short-circuited with the contact No. 10 to which the connection point T2 (V phase) of the armature coil Va is connected is electrically connected to the contact No. 13 to which the terminal L2 of the three-phase output terminal block 20 is connected. Moreover, the contact No. 20 that is short-circuited with the contact No. 16 to which the connection point T3 (W phase) of the armature coil Wa is connected is electrically connected to the contact No. 19 to which the terminal L3 of the three-phase output terminal block 20 is connected.

Accordingly, when the three-phase alternating current standard output of 400V is selected, the three-phase alternating current of 400 V generated by the electric generator main body 10 can be directly extracted from the three-phase output terminal block 20 without the inverter 32.

Note that, also when the three-phase alternating current standard output of 400 V is selected, it is possible to directly extract single-phase 100 V from the first single-phase 100 V outlet 52 and the second single-phase 100 V outlet 53 by electrically connecting the contacts Nos. 53 and 54 and the contacts Nos. 57 and 58. In addition, like the case where the three-phase alternating current inverter output of 200 V is selected, the single-phase 200 V outlet 51 is not available because the contacts Nos. 1 and 2 and Nos. 3 and 4 are electrically disconnected.

(2-4-3) Case where Single-Phase 200 V/100 V Output is Selected

When the switching lever 44 of the cam switch 40 is moved to the position illustrated in FIG. 13C and the single-phase alternating current output of 200 V/100 V is selected, the contacts Nos. 25 and 26 and Nos. 31 and 32 of the wire connection switching section 41 are connected. Therefore, the connection points T4 and T10 and the connection points T1 and T7 are connected, and the armature coils Ua and Ub are connected in parallel.

In addition, when the contacts Nos. 29 and 30 of the wire connection switching section 41 are connected and the contacts Nos. 39 and 40 of the wire connection switching section 41 are connected, the connection points T5 and T11 and the connection points T2 and T8 are connected, and the armature coils Va and Vb are connected in parallel.

In addition, when the contacts Nos. 45 and 46 and Nos. 51 and 52 of the wire connection switching section 41 are connected, the connection points T6 and T12 and the connection points T3 and T9 are connected, and the armature coils Wa and Wb are connected in parallel.

Moreover, when the contacts Nos. 37 and 38, Nos. 39 and 40, and Nos. 45 and 46 of the wire connection switching section 41 are connected, the connection points T2, T6, T8, and T12 are connected.

In addition, both the connection point T10 of the armature coil Ub and the connection point T11 of the armature coil Vb are connected to the terminal N of the three-phase output terminal block 20, and the connection points T10 and T11 are electrically connected.

Accordingly, the wire connection pattern of the armature coils Ua and Ub, Va and Vb, and Wa and Wb of the electric generator main body 10 is switched to the wire connection pattern of the single-phase alternating current of 200 V/100 V illustrated in FIG. 4.

When the single-phase alternating current output of 200 V/100 V is selected, the contact No. 6 connected to the connection point T1 (U phase) of the armature coil Ua is electrically disconnected from the contact No. 5 connected to the input terminal R of the inverter 32, the contact No. 10 connected to the connection point T2 (V phase) of the armature coil Va through the contact No. 43 of the wire connection switching section 41 is electrically disconnected from the contact No. 9 connected to the input terminal S of the inverter 32, and the contact No. 16 connected to the connection point T3 (W phase) of the armature coil Wa is electrically disconnected from the contact No. 15 connected to the input terminal T of the inverter 32. This makes it possible to prevent the inverter 32 from receiving the single-phase alternating current output from the electric generator main body 10.

On the other hand, when the single-phase 200 V/100 V output is selected, the contact No. 8 that is short-circuited with the contact No. 6 connected to the connection point T1 (U phase) of the armature coil Ua is electrically connected to the contact No. 7 connected to the terminal L1 of the three-phase output terminal block 20, the contact No. 14 that is short-circuited with the contact No. 10 connected to the connection point T2 (V phase) of the armature coil Va is electrically connected to the contact No. 13 connected to the terminal L2 of the three-phase output terminal block 20, and the contact No. 20 that is short-circuited with the contact No. 16 connected to the connection point T3 (W phase) of the armature coil Wa is electrically connected to the contact No. 19 connected to the terminal L3 of the three-phase output terminal block 20.

In addition, both the connection point T10 of the armature coil Ub and the connection point T11 of the armature coil Vb are connected to the terminal N of the three-phase output terminal block 20.

Accordingly, when the single-phase 200 V/100 V output is selected, the single-phase output generated by the electric generator main body 10 can be directly extracted from the three-phase output terminal block 20 without the inverter 32.

In addition, when the single-phase 200 V/100 V output is selected, the contact No. 2 of the connection switching section 42 to which the single-phase 200 V outlet 51 is connected is electrically connected to the contact No. 1 to which the terminal L1 of the three-phase output terminal block 20 is connected, and the contact No. 4 of the connection switching section 42 to which the single-phase 200 V outlet 51 is connected is electrically connected to the contact No. 3 to which the terminal L3 of the three-phase output terminal block 20 is connected.

As a result, it is possible to extract the single-phase alternating current of 200 V from the single-phase 200 V outlet 51 when the outlet 51 is connected to the connection point T1 (U phase) of the armature coil Ua and the connection point T3 (W phase) of the armature coil Wa in the wire connection pattern of the single-phase alternating current output illustrated in FIG. 4.

In addition, when the single-phase 200 V/100 V output is selected, the contacts Nos. 53 and 54 and the contacts Nos. 57 and 58 are electrically disconnected. Therefore, the first single-phase 100 V outlet 52 connected to the contact No. 54 is disconnected from the intermediate tap U2 of the armature coil Ub, and the second single-phase 100 V outlet 53 connected to the contact No. 58 is electrically disconnected from the intermediate tap W2 of the armature coil Wb.

On the other hand, when the contact No. 55 is electrically connected to the contact No. 56 that is short-circuited with the contact No. 54 to which the first single-phase 100 V outlet 52 is connected, the first single-phase 100 V outlet 52 is connected to the terminal L1 of the three-phase output terminal block 20 connected to the contact No. 1 that is short-circuited with the contact No. 55.

As a result, it is possible to extract, from the first single-phase 100 V outlet 52, the single-phase alternating current of 100 V between the connection point T1 of the armature coil Ua and the neutral point N.

In addition, when the contact No. 59 is electrically connected to the contact No. 60 that is short-circuited with the contact No. 58 to which the second single-phase 100 V outlet 53 is connected, the second single-phase 100 V outlet 53 is connected to the terminal L3 of the three-phase output terminal block 20 connected to the contact No. 3 that is short-circuited with the contact No. 59.

As a result, it is possible to extract, from the second single-phase 100 V outlet 53, the single-phase alternating current of 100 V between the connection point T3 of the armature coil Wa and the neutral point N.

(3) Others

The configuration example of the output format selector switch (cam switch) 40 according to Example 1 shown in Table 1 has been described above with reference to FIG. 13 to FIG. 15. However, the number of switching positions provided in the output format selector switch 40, the number of wire connection patterns switchable by the wire connection switching section 41, and the number of output circuits switchable by the connection switching section 42 can be appropriately modified in response to the specifications and the number of the inverters 32 of the output variable type electric generator 1, the number of selectable output formats, and the like.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

EXPLANATION OF REFERENCE NUMERALS

1. Output variable type electric generator
10. Electric generator main body
20. Three-phase output terminal block
30. Output circuit
32. Inverter
32a. Inverter (compliant with low voltage specifications)
32b. Inverter (compliant with high voltage specifications)
34. Inverter output circuit
34a. Low voltage inverter output circuit
34b. High voltage inverter output circuit
36. Standard output circuit
40. Output format selector switch (cam switch)
41. Wire connection switching section
42. Connection switching section
43. Interlocking mechanism
44. Switching lever
51. Single-phase 200 V outlet
52. First single-phase 100 V outlet
53. Second single-phase 100 V outlet
140. Terminal strip
141. Terminal
142. Short circuit plate
T1 to T12. Connection point (of an armature coil)
L1, L2, L3, N. Terminal (of a three-phase output terminal block)
R, S, T. Input terminal (of an inverter)
U, V, W. Output terminal (of an inverter)
Ua, Ub, Va, Vb, Wa, Wb. Armature coil

What is claimed is:

1. An output variable type electric generator comprising:
an electric generator main body capable of switching a three-phase alternating current to be output between a low voltage and a high voltage by switching a wire connection pattern of armature coils, the output variable type electric generator including an inverter output circuit and a standard output circuit between the electric generator main body and a three-phase output terminal block, the inverter output circuit connecting the electric generator main body to the three-phase output terminal block through an inverter having a specification voltage corresponding to the low voltage or the high voltage, the standard output circuit connecting the electric generator main body to the three-phase output terminal block without the inverter, the output variable type electric generator further including an output format selector switch having at least two switching positions including an inverter output position for selecting an output through the inverter output circuit and a standard output position for selecting an output through the standard output circuit, the output format selector switch including:
- a wire connection switching section to switch a wire connection of the armature coils of the electric generator main body between a low voltage wire connection pattern and a high voltage wire connection pattern;
- a connection switching section to switch a connection of the electric generator main body and the three-phase output terminal block between an inverter connection performed through the inverter output circuit or a standard connection performed through the standard output circuit; and
- an interlocking mechanism to cause the wire connection switching section and the connection switching section to interlock with each other, and the interlocking mechanism causing the connection switching section to perform the inverter connection and causing the wire connection switching section to switch to a wire connection pattern for generating a voltage corresponding to the specification voltage of the inverter when the switching position of the output format selector switch is in the inverter output position.

2. The output variable type electric generator according to claim 1,
wherein, when the switching position of the output format selector switch is in the standard output position, the interlocking mechanism causes the connection switching section to perform the standard connection and causes the wire connection switching section to perform switching to a wire connection pattern for generating a voltage that is different from the specification voltage of the inverter.

3. The output variable type electric generator according to claim 2,
wherein the output format selector switch further has a second standard output position as the switching position, and
when the output format selector switch is in the second standard output position, the interlocking mechanism causes the connection switching section to perform the standard connection and causes the wire connection switching section to perform switching to the wire connection pattern for generating the voltage corresponding to the specification voltage of the inverter.

4. The output variable type electric generator according to claim 3,
wherein the wire connection switching section of the output format selector switch is further capable of switching to a wire connection pattern of the armature coils for allowing the electric generator main body to output a single-phase alternating current in addition to switching between the low voltage and the high voltage of the three-phase alternating current output,
the output format selector switch further has a single-phase output position, and
when the switching position of the output format selector switch is in the single-phase output position, the interlocking mechanism causes the connection switching section to perform the standard connection and causes the wire connection switching section to perform switching to a wire connection pattern for outputting the single-phase alternating current.

5. The output variable type electric generator according to claim 2,
wherein the wire connection switching section of the output format selector switch is further capable of switching to a wire connection pattern of the armature coils for allowing the electric generator main body to output a single-phase alternating current in addition to switching between the low voltage and the high voltage of the three-phase alternating current output,
the output format selector switch further has a single-phase output position, and
when the switching position of the output format selector switch is in the single-phase output position, the interlocking mechanism causes the connection switching section to perform the standard connection and causes the wire connection switching section to perform switching to a wire connection pattern for outputting the single-phase alternating current.

6. The output variable type electric generator according to claim 1,
wherein the wire connection switching section of the output format selector switch is further capable of switching to a wire connection pattern of the armature coils for allowing the electric generator main body to output a single-phase alternating current in addition to switching between the low voltage and the high voltage of the three-phase alternating current output,
the output format selector switch further has a single-phase output position, and
when the switching position of the output format selector switch is in the single-phase output position, the interlocking mechanism causes the connection switching section to perform the standard connection and causes the wire connection switching section to perform switching to a wire connection pattern for outputting the single-phase alternating current.

7. An output variable type electric generator comprising:
an electric generator main body capable of switching a three-phase alternating current to be output between a low voltage and a high voltage by switching a wire connection pattern of armature coils,
the output variable type electric generator including a low voltage inverter output circuit and a high voltage inverter output circuit between the electric generator main body and a three-phase output terminal block,
the low voltage inverter output circuit connecting the electric generator main body to the three-phase output terminal block through a low voltage inverter having a specification voltage corresponding to the low voltage,
the high voltage inverter output circuit connecting the electric generator main body to the three-phase output terminal block through a high voltage inverter having a specification voltage corresponding to the high voltage,
the output variable type electric generator further including an output format selector switch having at least two switching positions including a low voltage inverter output position for selecting an output through the low voltage inverter output circuit and a high voltage inverter output position for selecting an output through the high voltage inverter output circuit, the output format selector switch including:
- a wire connection switching section to switch a wire connection of the armature coils of the electric generator main body between a low voltage wire connection pattern and a high voltage wire connection pattern;
- a connection switching section to switch a connection of the electric generator main body and the three-phase output terminal block between a low voltage inverter connection performing through the low voltage inverter output circuit or a high voltage inverter connection performing through the high voltage inverter output circuit; and
- an interlocking mechanism to cause the wire connection switching section and the connection switching section to interlock with each other, when the switching position of the output format selector switch is in the low voltage inverter output position, the interlocking mechanism causing the connection switching section to perform the low voltage inverter connection and causing the wire connection switching section to switch to a wire connection pattern for generating a voltage corresponding to the specification voltage of the low voltage inverter, and when the switching position of the output format selector switch is the high voltage inverter output position, the interlocking mechanism causes the connection switching section to perform the high voltage inverter connection and causes the wire connection switching section to switch to a wire connection pattern for generating a voltage corresponding to the specification voltage of the high voltage inverter.

8. The output variable type electric generator according to claim 7, wherein the output variable type electric generator further includes a standard output circuit between the electric generator main body and the three-phase output terminal block, the standard output circuit connects the electric generator main body to the three-phase output terminal block without the low voltage inverter and the high voltage inverter, the output format selector switch further has a low voltage standard output position and a high voltage standard output position as the switching positions, the connection switching section is capable of switching a connection of the electric generator main body and the three-phase output terminal block to a standard connection performing through the standard output circuit, when the switching position of the output format selector switch being in the low voltage standard output position, the interlocking mechanism causes the connection switching section to perform the standard connection and causes the wire connection switching section to perform switching to a wire connection pattern for generating a voltage corresponding to the low voltage, and when the switching position of the output format selector switch being in the high voltage standard output position, the interlocking mechanism causing the connection switching section to perform the standard connection and causing the wire connection switching section to perform switching to a wire connection pattern for generating a voltage corresponding to the high voltage.

9. The output variable type electric generator according to claim 8, wherein the wire connection switching section of the output format selector switch is further capable of switching to a wire connection pattern of the armature coils for allowing the electric generator main body to output a single-phase alternating current in addition to switching between the low voltage and the high voltage of the three-phase alternating current output, the output format selector switch further has a single-phase output position, and when the switching position of the output format selector switch is in the single-phase output position, the interlocking mechanism causes the connection switching section to perform the standard connection and causes the wire connection switching section to perform switching to a wire connection pattern for outputting the single-phase alternating current.

10. The output variable type electric generator according to claim 7, wherein the wire connection switching section of the output format selector switch is further capable of switching to a wire connection pattern of the armature coils for allowing the electric generator main body to output a single-phase alternating current in addition to switching between the low voltage and the high voltage of the three-phase alternating current output, the output format selector switch further has a single-phase output position, and when the switching position of the output format selector switch is in the single-phase output position, the interlocking mechanism causes the connection switching section to perform the standard connection and causes the wire connection switching section to perform switching to a wire connection pattern for outputting the single-phase alternating current.

* * * * *